(12) United States Patent
Li et al.

(10) Patent No.: US 12,388,257 B1
(45) Date of Patent: Aug. 12, 2025

(54) METHOD AND SYSTEM OF MULTI-TIME SCALE COMPOUND CONTROL OF INTEGRATED ENERGY SYSTEM BASED ON DUAL-LOOP FEEDBACK ROBUST MODEL PREDICTIVE CONTROL

(71) Applicant: SHANDONG UNIVERSITY, Jinan (CN)

(72) Inventors: Ke Li, Jinan (CN); Yuchen Mu, Jinan (CN); Haiyang Wang, Jinan (CN); Chenghui Zhang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 19/061,012

(22) Filed: Feb. 24, 2025

(30) Foreign Application Priority Data

May 28, 2024 (CN) .......................... 202410672819.6

(51) Int. Cl.
*H02J 3/00* (2006.01)
*G05B 13/04* (2006.01)
(52) U.S. Cl.
CPC ............ *H02J 3/003* (2020.01); *G05B 13/048* (2013.01); *H02J 2203/20* (2020.01)
(58) Field of Classification Search
CPC ...... H02J 3/003; H02J 2203/20; G05B 13/048
See application file for complete search history.

(56) References Cited

U.S. PATENT DOCUMENTS

| | | | |
|---|---|---|---|
| 2015/0184550 A1* | 7/2015 | Wichmann | G05B 13/04 700/287 |
| 2015/0185716 A1* | 7/2015 | Wichmann | F02C 9/28 700/287 |

(Continued)

FOREIGN PATENT DOCUMENTS

| | | |
|---|---|---|
| CN | 112865174 A | 5/2021 |
| CN | 115238991 A | 10/2022 |

(Continued)

OTHER PUBLICATIONS

Li, Bing et al., "Research on the Optimal Regulation and Control Model of the Thermal-Electric-Gas-Storage Coupling Energy System of All Renewable Energy Sources", Power System and Clean Energy, 36, 07, Jul. 31, 2020.

(Continued)

*Primary Examiner* — Ziaul Karim
(74) *Attorney, Agent, or Firm* — IPRO, PLLC

(57) ABSTRACT

The present invention belongs to the technical field of integrated energy system (IES), and provides a method and system of multi-time scale compound control of IES based on dual-loop feedback robust model predictive control (RMPC), comprising: analyzing multi-time scale characteristics of typical equipment and integrated demand response (IDR), establishing a compound control framework for equipment-side-load-side coordination, carrying out differential control on different time scales through intra-day three-layer controller aiming at the difference in regulation rate and response characteristics between the multi-energy (Continued)

equipment and the IDR, modifying, layer by layer, a reference of upper layer and issuing control strategies in real-time, which fully stimulates flexibility on both sides of supply and demand.

9 Claims, 11 Drawing Sheets

(56) References Cited

U.S. PATENT DOCUMENTS

| | | | |
|---|---|---|---|
| 2015/0316946 A1* | 11/2015 | Wenzel | G05B 15/02 |
| 2016/0377306 A1* | 12/2016 | Drees | H02J 3/28 |
| | | | 700/295 |
| 2017/0102162 A1* | 4/2017 | Drees | F24F 11/523 |
| 2018/0356770 A1* | 12/2018 | ElBsat | H02J 3/38 |
| 2018/0356782 A1* | 12/2018 | ElBsat | G05B 15/02 |

FOREIGN PATENT DOCUMENTS

| | | |
|---|---|---|
| CN | 116247743 A | 6/2023 |
| CN | 116624984 A | 8/2023 |
| WO | 2021244000 A1 | 12/2021 |

OTHER PUBLICATIONS

Xiaohao et al., "Multi-time Scale Coordinated Optimal Dispatch of Microgrid Based on Model Predictive Control", Automation of Electric Power Systems, 18, Sep. 30, 2016.

* cited by examiner

METHOD AND SYSTEM OF MULTI-TIME SCALE COMPOUND CONTROL OF INTEGRATED ENERGY SYSTEM BASED ON DUAL-LOOP FEEDBACK ROBUST MODEL PREDICTIVE CONTROL

CROSS-REFERENCE TO RELATED APPLICATIONS

The present invention claims priority benefits to Chinese Patent Application number 202410672819.6, entitled "Method and System of Multi-time Scale Compound Control of Integrated Energy System Based on Dual-loop feedback Robust Model Predictive Control", filed on May 28, 2024, with the China National Intellectual Property Administration (CNIPA), the entire contents of which are incorporated herein by reference.

TECHNICAL FIELD

The present invention belongs to the technical field of integrated energy systems, and particularly relates to a method and system of multi-time scale compound control of integrated energy system (IES) based on dual-loop feedback robust model predictive control (RMPC).

BACKGROUND

The statements in this section merely provide background information related to the present invention and are not necessarily prior art.

With the continuous improvement of penetration rate of renewable energy and the fast popularization of energy marketization reform, the uncertainty on both supply and demand sides of IES increases rapidly, and an efficient and reliable operation of the IES faces challenges.

In order to overcome the external uncertainty environment from the root, some researchers try to improve the prediction accuracy by modifying prediction models. However, the inherent randomness and volatility of source-load lead to prediction errors that can never be completely eliminated. Although the improved prediction model alleviates the influence of uncertain factors to some extent, it still does not touch the core problem, and the uncertain environment still exists.

Advanced scheduling policies are another key to meet the challenges of uncertain environments. Especially in the case that the accurate prediction result cannot be obtained, the scheduling policy considering the influence of uncertainty becomes more and more important. The advanced scheduling policies proposed so far include stochastic optimization, robust optimization, fuzzy chance-constrained programming, multi-time scale optimization, model predictive control (MPC) and its derivatives. These studies provide valuable lessons for energy management under different scenarios and mitigate the adverse effects of uncertainties. However, these methods have some defects when applied alone, such as poor economy of robust optimization, poor reliability of stochastic optimization, insufficient accuracy of prediction model, poor anti-interference ability of multi-time scale optimization, MPC cannot adapt to multiple uncertainty environment and so on. Existing scheduling policies still cannot help the IES overcome the uncertain environments.

Demand response (DR) is the key to stimulate the interaction between demand-side resources and renewable energy. It is of great significance to mobilize the uncertainty of demand-side resistance and improve the consumption capacity of renewable energy through secondary load scheduling through the DR. In particular, the DR in the IES has evolved into an integrated demand response (IDR) that covers more load types, has higher flexibility than the DR, and is more critical to guiding horizontal multi-energy complementarity and vertical source-load coordination within the system. However, due to the strong interaction between heterogeneous energy sources and the difference in dynamic characteristics, the existing methods are difficult to reasonably give the response of different IDRs in different periods, and are not flexible enough to fully utilize the complementary characteristics of the IDR and renewable energy.

To sum up, for the efficient operation of the IES in the uncertain environment, domestic and foreign scholars have given many solutions, trying to weaken the influence of the uncertain environment by using the accurate prediction model or the advanced scheduling policy and new IDR to guide the IES to play its advantages of multi-energy complementarity and source-load coordination. However, there are some difficulties in the implementation of the above solutions at this stage, and there is still no perfect means to solve the impact of uncertainty at this stage. There is an urgent need for an effective integrated scheduling framework to coordinate existing methods, maximize their advantages and eliminate their disadvantages.

SUMMARY

In order to solve at least one technical problem existing in the above background art, the present invention provides a method and system of multi-time scale compound control of IES based on dual-loop feedback RMPC, organically integrating multi-time scale optimization ideas, robust optimization algorithms, advanced prediction models, IDR policy, and a model predictive control (MPC) itself by leveraging the flexibility and scalability advantages of the MPC framework, to establish a compound control framework based on dual-loop feedback RMPC, which innovatively achieves the collaboration between the source-load prediction model and robust optimization algorithm through real-time feedback of an outer loop, successfully achieving dynamic adaptive adjustment of uncertainty; and, drawing on the source-load uncertainty handling method, the modeled uncertainty of output disturbance of equipment is fed back in real-time by using an inner loop, enhancing the reliability of the control sequence.

To achieve the above objects, the present invention adopts the following technical solutions.

A first aspect of the present invention provides a method of multi-time scale compound control of IES based on dual-loop feedback RMPC, comprising the following steps:
  acquiring day-ahead source-load prediction data of an IES; wherein, the IES comprises an electric power subsystem, a thermal power subsystem and a natural gas subsystem;
  processing the acquired day-ahead source-load prediction data of the IES through two stages of day-ahead scheduling and intra-day calibrating, obtaining an incentive-based demand response (IBDR) of electric load and physical values of adjustments of outputs of relevant equipment in the electric power subsystem, the thermal power subsystem or the natural gas subsystem; wherein,
  in the day-ahead scheduling stage, determining a price-based demand response (PBDR) of the electric load and the gas load, and initial reference scheduling plans of relevant equipment in the electric power subsystem, the natural gas subsystem and the thermal power subsystem; and in the intra-day calibrating stage, based on the PBDR of the electric and gas loads, and the initial reference scheduling plans of the relevant equipment in the electric power subsystem, the natural gas subsystem and the thermal power subsystem, dividing the intra-day calibrating into a fast-control sub-layer, a median-control sub-layer and a slow-control sub-layer according to a dynamic characteristic difference of multi-heterogeneous energy source; performing a differential control by using controllers with different time scales; constructing a dual-loop feedback structure at each of the sub-layers by taking control time intervals of the each of the sub-layers as corresponding scales; acquiring output disturbances of equipment and the DR by an inner loop, and feeding back to an outer loop; updating a source-load data in the outer loop, dynamically training a system state prediction model, adjusting uncertain parameters in the IES through guiding a robust optimization algorithm, adjusting a reference scheduling plan output from an upper sub-layer layer by layer;

wherein, according to a solution result from the slow-control sub-layer, determining an IDR quantity of heat load, adjusting outputs of a combined heat and power unit (CHP), a gas boiler (GB), an electric boiler (EB) and a heat storage unit (HS) in the thermal power subsystem, and correcting a reference trajectory of the median-control sub-layer; according to a solution result from the median-control sub-layer, determining an IDR quantity of gas load, adjusting outputs of an electric power-to-gas unit (P2G) and a gas storage tank (GS) in the natural gas subsystem, adjusting a purchase quantity of gas simultaneously, and correcting a reference trajectory of the fast-control sub-layer; and, according to a solution result from the fast-control sub-layer, determining an IDR quantity of electric load, adjusting an output of an electric storage unit (ES), and adjusting a purchase quantity of electricity simultaneously.

A second aspect of the present invention provides a system of multi-time scale compound control of IES based on dual-loop feedback RMPC, comprising:

a day-ahead source-load prediction data acquisition module, configured to: acquire day-ahead source-load prediction data of an IES; wherein, the IES comprises an electric power subsystem, a thermal power subsystem and a natural gas subsystem;

an initial scheduling plan obtaining module, configured to: process the acquired day-ahead source-load prediction data of the IES through a day-ahead scheduling, to obtain a PBDR of the electric load and an initial reference scheduling plan of relevant equipment in the electric power subsystem, the natural gas subsystem and the thermal power subsystem; and a compound control module, configured to:

process the acquired day-ahead source-load prediction data of the IES through two stages of day-ahead scheduling and intra-day calibrating, obtaining an IBDR of electric load and physical values of adjustments of outputs of relevant equipment in the electric power subsystem, the natural gas subsystem or the thermal power subsystem; wherein, in the day-ahead scheduling stage, determining the PBDR of the electric load and the initial reference scheduling plans of relevant equipment in the electric power subsystem, the natural gas subsystem and the thermal power subsystem, respectively; and in the intra-day calibrating stage, based on the PBDR of the electric load and the initial reference scheduling plan of the relevant equipment in the electric power subsystem, the natural gas subsystem and the thermal power subsystem, dividing the intra-day calibrating into a fast-control sub-layer, a median-control sub-layer and a slow-control sub-layer according to a dynamic characteristic difference of multi-heterogeneous energy source; performing a differential control by using controllers with different time scales; constructing a dual-loop feedback structure at each of the sub-layers by taking control time intervals of the each of the sub-layers as corresponding scales; acquiring output disturbances of equipment and the DR by an inner loop, and feeding back to an outer loop; updating a source-load data in the outer loop, dynamically training a system state prediction model, adjusting uncertain parameters in the IES through guiding a robust optimization algorithm, adjusting a reference scheduling plan output from an upper sub-layer layer by layer;

wherein, according to a solution result from the slow-control sub-layer, determining an IDR quantity of heat load, adjusting outputs of a CHP, a GB, an EB and a HS in the thermal power subsystem, and correcting a reference trajectory of the median-control sub-layer; according to a solution result from the median-control sub-layer, determining an IDR quantity of gas load, adjusting outputs of a P2G and a GS in the natural gas subsystem, adjusting a purchase quantity of gas simultaneously, and correcting a reference trajectory of the fast-control sub-layer; and, according to a solution result from the fast-control sub-layer, determining an IDR quantity of electric load, adjusting an output of an ES, and adjusting a purchase quantity of electricity simultaneously.

In a third aspect, the invention provides a non-transitory computer-readable storage medium.

A computer-readable storage medium is non-transitory, having a computer program stored thereon; wherein, when the computer program is executed by a processor, implements steps of a method of multi-time scale compound control of an IES based on dual-loop feedback RMPC described above.

In a fourth aspect, the invention provides a computer apparatus.

The computer device comprises a memory, a processor, and a computer program stored in the memory and executable on the processor; wherein, when the processor executing the program, implementing steps of a method of multi-time scale compound control of an IES based on dual-loop feedback RMPC described above.

Compared with the prior art, the present invention has the advantages that:

According the present invention, organically integrating multi-time scale optimization ideas, robust optimization algorithms, advanced prediction models, IDR policy, and the MPC itself by leveraging the flexibility and scalability advantages of the MPC framework, establishing the compound control framework based on the dual-loop feedback RMPC, can innovatively achieve the collaboration between the source-load prediction model and robust optimization algorithm through real-time feedback of an outer loop, successfully achieving dynamic adaptive adjustment of uncertainty; and, drawing on the source-load uncertainty handling method, the modeled uncertainty of output disturbance of equipment is fed back in real-time by using an inner loop, enhancing the reliability of the control sequence. According to the present invention, through the coordination of all component elements and the framework, the regulation potential of flexible resources on both source-side and load-side can be fully released, and the interference of an external uncertain environment is resisted.

Additional aspects of the present invention will be set forth in part in the description which follows, and in part will be obvious from the description, or may be learned by practice of the present invention.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

The present invention will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise", and/or "comprising" used in this specification indicate that there are features, steps, operations, devices, components, and/or combinations thereof.

Example 1

Figure 1:
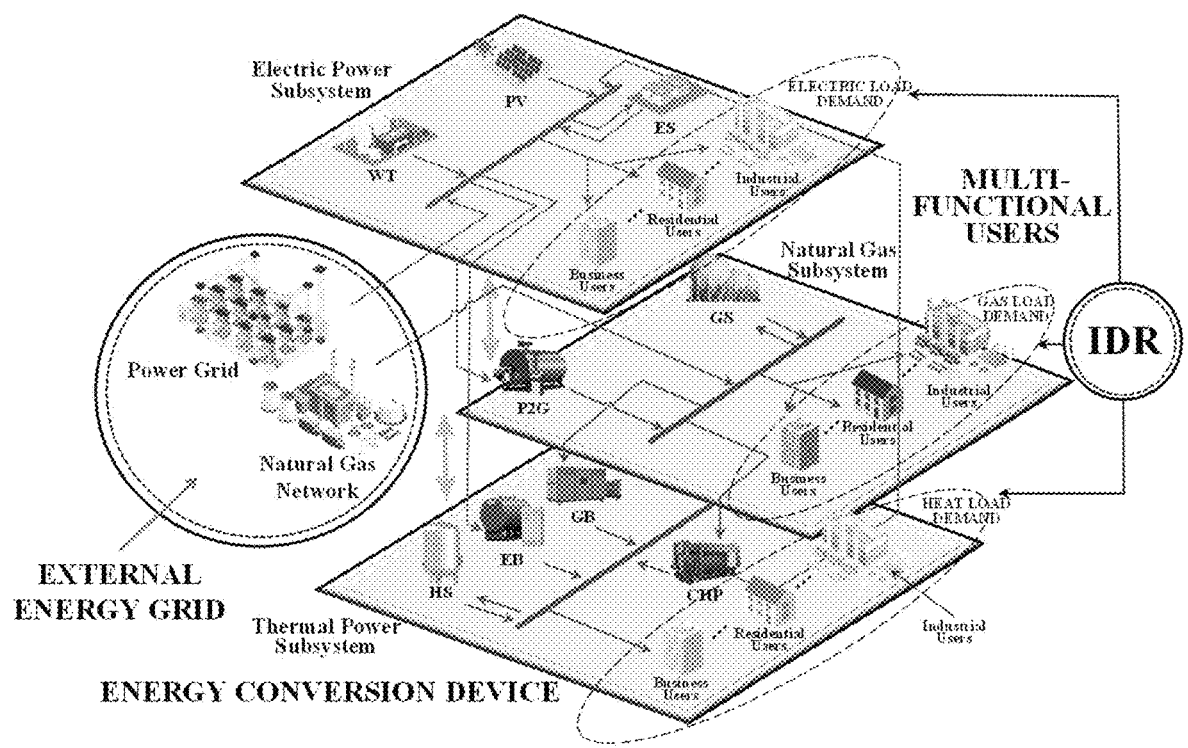
FIG. 1 is a structural diagram of an IES according to an example of the present invention.

As shown in FIG. 1, an IES comprises three energy subsystems, which are an electric power subsystem, a thermal power subsystem and a natural gas subsystem, and each of the subsystems is interconnected to and coupled with each other; wherein, the electric power subsystem comprises a wind turbine (WT), a photovoltaic unit (PV) and an electric storage unit (ES), the natural gas subsystem comprises an electric power-to-gas unit (P2G) and a gas storage unit (GS), and the thermal power subsystem comprises a combined heat and power unit (CHP), a gas boiler (GB), an electric boiler (EB) and a heat storage unit (HS).

An upstream node of the IES is connected to an external power grid and a natural gas grid, and internally coupled with energy supply, conversion and energy storage equipment in various forms of energy; a downstream node of the IES covers demands of electricity, gas and heat energies and an IDR.

Wherein, the IDR comprises a price-based demand response (PBDR), an alternative demand response (ADR) and an incentive-based demand response (IBDR). Energy conversion equipment comprises the P2G, the CHP, the EB and the GB. Energy storage equipment comprises a hot-water storage tank (i.e., the HS), the GS and the ES. The WT and PV equipped in the system are used to input renewable energy into the energy network. End users can obtain diversified energy supply services from the IES according to actual energy demand.

For an equipment-side:

The electric power, natural gas and thermal power subsystems have remarkable multi-time scale characteristics. The uniform scheduling period cannot balance the control performance of each of the subsystems. In the electric power subsystem, the power grid can achieve an instantaneous response to the scheduling commands, reaching steady state values immediately, and allowing related equipment to cope with instantaneous power fluctuations by receiving higher frequency control commands without being constrained by energy transmission. For the thermal power and natural gas subsystems, the response process needs a certain time to reach the steady state value after scheduling command is issued due to certain heat inertia and storage characteristics of heating network and buildings. Frequent adjustment of heat and natural gas equipment will lead to transient changes in system state and destroy the quality of energy supply.

Figure 4:
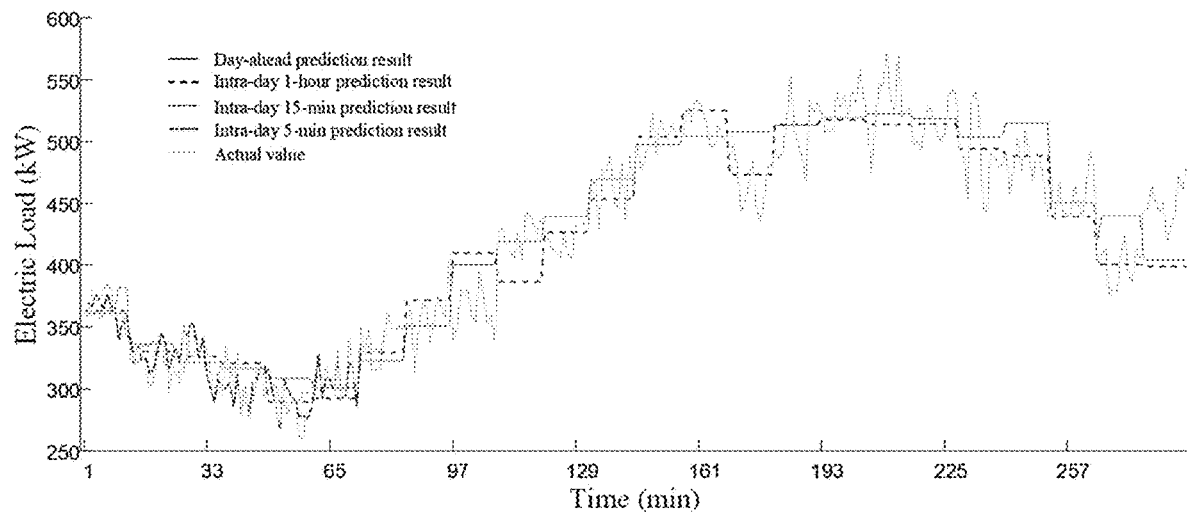
FIG. 4 is a multi-time scale prediction result of an electric load according to an example of the present invention.

The determining of the scheduling period should take into account the characteristics of multi-heterogeneous energy flow transmission and multi-type equipment control. Even if the response time of some equipment is short, but due to energy transmission restrictions, it is not appropriate to adjust frequently. For example, the CHP system, the response rate of a core equipment-gas turbine-thereof is fast, but the output involves heat energy and is connected to a heat network, the scheduling period should not be too short, due to the influence of heat inertia and the heat medium transmission limit. Adjustment rates of typical equipment in the IES are shown in FIG. 4. It can be seen from FIG. 4 that the operation characteristics of equipment with power electronic devices as the core controller and combustion equipment are significantly different. When the equipment operate jointly, it is likely that system control deviation will be caused by different response characteristics and dynamic characteristics of the energy network. Therefore, a coordinated multi-time-scale control policy for each subsystem is established.

For a demand-side:

The multi-time scale characteristics of the IDR are embodied in two aspects. One aspect is that the PBDR and the IBDR belong to response resources in different periods due to different pricing methods and incentive mechanisms. Wherein, an implementation of the PBDR is that users adjust their energy consumption behavior spontaneously according to the price information released by energy suppliers, and the response time is long. And, the energy prices generally follow a day-ahead pricing model, so the PBDR needs to respond in the day-ahead. However, an implementation of the IBDR is that the energy supplier signs a contract with the user in advance and specifies the response rate according to the contract. When necessary, the load control can be carried out directly, and the response time is short. Therefore, the IBDR is not limited to the day-ahead response, but can be divided into four types according to the time of advance notification, which are: Class A IBDR (day-ahead response), Class B IBDR (intra-day 15 min-2 h response), Class C IBDR (intra-day 5 min-15 min response) and Class D IBDR (real-time response). The other aspect is that the IDR covers more response resources of load types, and is affected by the response characteristics of multi-heterogeneous energy flow. Wherein, the ADR involves the mutual conversion of electricity, natural gas and heat. Limited by different energy transmission characteristics and coupling equipment response characteristics, there are technical obstacles to uniform implementation at the same time-scale. In addition, the IBDR can be performed for multiple types of loads in the IES. However, due to energy constraints, different loads have different execution periods. For example, the natural gas load, due to the pipeline-storage characteristics of the natural gas network, the IBDR cannot participate in intra-day real-time response. Obviously, if all DR resources are uniformly scheduled, it is difficult to fully tap the adjustment potential of load-side resources and absorb new energy sources with intra-day deviation. Therefore, the IDR multi-time scale coordinated control policy is established.

Based on the multi-time scale response characteristics of the equipment side and the demand side and a RMPC dual-closed loop feedback mechanism, the present invention provides a source-load multi-time scale compound control policy, which is divided into two stages of a day-ahead scheduling and an intra-day calibrating. The day-ahead scheduling takes 24 hours as a scheduling cycle, formulates the equipment start-stop plan and equipment operation plan for 24 periods as a reference of an intra-day calibrating layer to ensure an overall performance of the control policy, and determines the PBDR and the Class A IBDR scheduling plan. In order to improve the robustness and anti-interference ability of open-loop scheduling, the RMPC method is introduced into the intra-day calibrating layer. The RMPC method is based on an idea of rolling horizon, combining a current operation state with a future predicted state of the system, to obtain an optimal control sequence, and uses a first item of the control sequence for the actual control of the system. Then, the above-described control process is repeatedly executed. According to the difference of dynamic characteristics of multi-heterogeneous energy sources, the intra-day calibrating layer is divided into a fast-control sub-layer, a median-control sub-layer and a slow-control sub-layers, and the RMPC controllers with different time scales are used for differential control to absorb the uncertainties of the source and the load. Wherein, a prediction time domain of the slow-control sub-layer is 4 hours, and a time scale is 1 hour. The slow-control sub-layer is used to control the thermal power subsystem with slow dynamic characteristics, adjust the output of the CHP, the GB, the EB and the HS and determine the electric-heat ADR scheduling plan.

In order to further reduce the influence of the output uncertainty of the renewable energy, multi-energy load and controlled objects, the slow-control sub-layer acts as a bridge connecting different control stages, adjusts the day-ahead reference plan of the electric power and natural gas subsystems while controlling the thermal power subsystem, and issues a reference that is more in line with the actual situation and has global characteristics. A prediction time domain of the median-control sub-layer is 2 hours and a time scale is 15 minutes. The median-control sub-layer is used to control the natural gas subsystem, adjust a gas purchase quantity, outputs of the P2G and the GS, determine an electricity-gas ADR and the Class B IBDR scheduling plan, and adjust the electric power subsystem reference plan. A prediction time domain of the fast-control sub-layer is 20 minutes, and a time scale is 5 minutes. The fast-control sub-layer is used to control the electric power subsystem, adjust the power purchase quantity, the output of the ES and determine the Class C IBDR scheduling plan.

Figure 2:
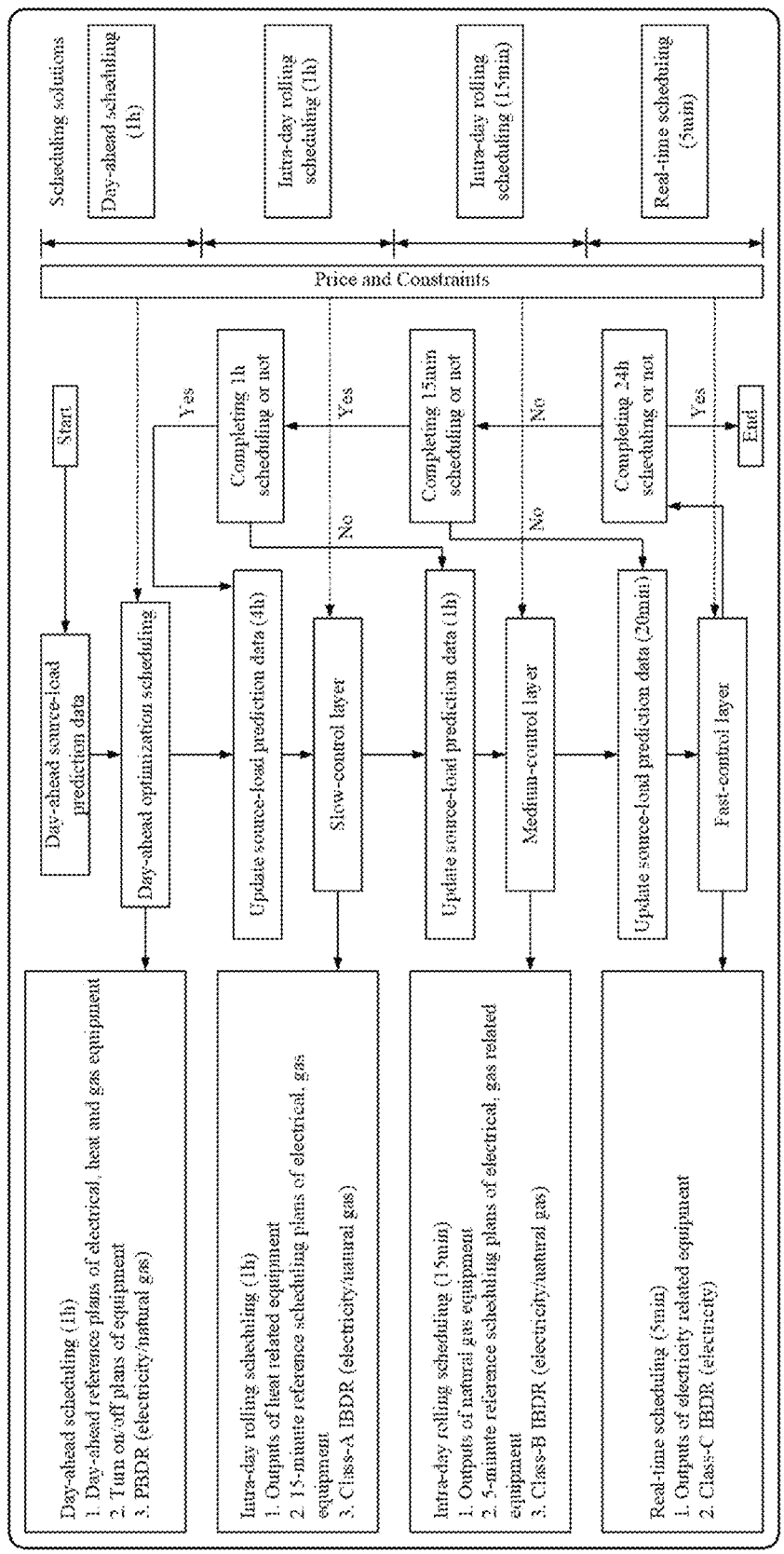
FIG. 2 is an architecture diagram of a dual-loop feedback RMPC according to an example of the present invention.

Based on the conventional MPC policy, the present invention establishes a dual-closed loop feedback mechanism as shown in FIG. 2. An inner layer is feedback of an actual output and output disturbance of equipment and demand response, and an outer layer is feedback of real-time source-load data and training of the prediction model.

The inner layer can effectively avoid the deviation accumulation between scheduling value and actual output in the rolling solution process by monitoring and collecting the operation state of equipment and DR in real-time. At the same time, the uncertainty of output disturbance of equipment and DR is modeled, and an incremental state space equation comprising output disturbance term of equipment and DR is established under the RMPC framework, to enhance the reliability of the control policy.

Considering the uncertainty of the actual controlled object of the system, it is impossible for the planned output to be exactly the same as the actual output of equipment and DR. After the control variable is controlled, the actual output value of the controlled object will deviate from the planned value. Therefore, the present example refers to the processing method of uncertainty of renewable energy and multi-energy load, and sets $\delta$ as the output disturbance of equipment, which is regarded as robust optimization uncertainty and described by cardinality uncertainty set, as follows:

$$U = \left\{ \delta : \left| \frac{\delta - \hat{\delta}}{\overline{\delta} - \underline{\delta}} \right| \leq \Gamma, |\delta| \leq e \right\},$$

where, $\overline{\delta}$ and $\underline{\delta}$ are an upper limit and a lower limit of disturbance error of equipment, respectively; and $\hat{\delta}$ is a measured value of disturbance error of equipment at the previous time, which is obtained through feedback. Using δ to simulate possible disturbances generated by the equipment and DR, and using an inner loop feedback to include the disturbances into the state space model at time t+1, and taking them as the constraint to obtain reliable and stronger control policy.

Taking the real-time control layer as an example, a system state prediction model based on state space equations is established as follows:

$$x(t+1|t) = A_x x(t) + B_u u(t) \odot d(t) + B_w w(t)$$

$$y_c(t) = C_c x(t),$$

where, a state variable matrix of equipment output in the above formula is:

$$x(t) = [P_{ES.chr}(t), P_{ES.dis}(t), S_{ES}(t), P_{grid}(t), IBDR_{III}(t)]^T;$$

a control variable matrix considering output disturbance may be written as follows:

$$u(k) \odot (d(k) = [\Delta P_{ES.chr}(t)(1+\xi_{ES.chr}(t)), \Delta P_{ES.dis}(t)(1+\xi_{ES.dis}(t)), \Delta IBDR_{III}(t)(1+\xi_{III}(t))]^T;$$

where, d(t) is disturbance of output of equipment and IDR;

a disturbance variable matrix is as follows:

$$w(t) = [\Delta P_{e,load}(t), \Delta P_{WT}(t), \Delta P_{PV}(t), \Delta P_{MT}^{sup\ ref}(t), \Delta P_{P2G}^{sup\ ref}(t), \Delta P_{EB}^{sup\ ref}(t)]^T;$$

and, an output variable matrix is as follows:

$$y_c(t) = [S_{ES}(t), P_{grid}(t)]^T;$$

let $$\alpha = \frac{\eta_{ES.chr}}{E_{bat}} \Delta t, \beta = \frac{-1}{E_{bat} \eta_{ES.dis}} \Delta t,$$

wherein $\eta_{ES.chr}$ is a charging efficiency of ES, $E_{bat}$ is a state of charge (SOC), $\Delta t$ is a time interval, and $\eta_{ES.dis}$ is a discharge efficiency of the ES; according to an iterative equation of real-time power balance and SOC of stored energy of IES, obtaining:

$$A_x = \begin{bmatrix} 1 & 0 & 0 & 0 & 0 \\ 0 & 1 & 0 & 0 & 0 \\ \alpha & \beta & 1-\sigma & 0 & 0 \\ 0 & 0 & 0 & 1 & 0 \\ 0 & 0 & 0 & 0 & 1 \end{bmatrix},$$

$$B_u = \begin{bmatrix} 1 & 0 & 0 \\ 0 & 1 & 0 \\ \alpha & \beta & 0 \\ 0 & 1 & 0 \\ 0 & 0 & 1 \end{bmatrix},$$

$$B_w = \begin{bmatrix} 0 & 0 & 0 & 0 & 0 & 0 \\ 0 & 0 & 0 & 0 & 0 & 0 \\ 0 & 0 & 0 & 0 & 0 & 0 \\ 1 & -1 & -1 & -1 & 1 & 1 \\ 0 & 0 & 0 & 0 & 0 & 0 \end{bmatrix},$$

$$C_c = \begin{bmatrix} 0 & 0 & 1 & 0 & 0 \\ 0 & 0 & 0 & 1 & 0 \end{bmatrix},$$

where, $\Delta P_{ES.chr}(t)$ and $\Delta P_{ES.dis}(t)$ are output variations of power storage device with respect to the previous time, respectively; $\Delta IBDR_{III}(t)$ is output variation of three types of IBDR of electric load with respect to the previous time, respectively; $\Delta P_{e,load}(t)$, $\Delta P_{WT}(t)$ and $\Delta P_{PV}(t)$ are outputs of the electric load, a wind power and a PV with respect to the previous time, respectively; $\Delta P_{MT}^{sup\ ref}(t)$, $\Delta_{P2G}^{sup\ ref}(t)$ and $\Delta_{EB}^{sup\ ref}(t)$ are upper reference planned values of MT, P2G and EB equipment at time t, respectively; $\xi_{ES.chr}(t)$, $\xi_{ES.dis}(t)$ and $\xi_{III}(t)$ are battery charge and discharge and disturbance of IBDR output at time t, respectively; $S_{ES}(t)$ and $P_{grid}(t)$ are battery storage energy and purchase rate of electricity from superior power grid at time t, respectively.

The outer layer dynamically trains the prediction model through real-time updating of source-load real data, and guides the uncertainty adjustment of robust optimization algorithm. Therefore, the present invention innovatively designs a cooperative mechanism of evaluation index of training of the prediction model and uncertain parameters of the robust optimization, and simply and effectively realizes a dynamic equilibrium of the algorithm conservatism and economy.

A cooperative method of accuracy of the prediction model and uncertain parameters of the robust optimization is as follows:

Choosing a cardinality-type uncertainty set to describe the uncertainty parameter of the Robust optimization, can be expressed as:

$$U = \left\{ \xi : \left| \frac{\xi - \hat{\xi}}{\overline{\xi} - \underline{\xi}} \right| \leq \Gamma, |\xi| \leq e \right\},$$

where, ξ denotes an actual value of the uncertain parameter, comprising outputs of wind power and PV, and electric, heat and gas loads; $\hat{\xi}$ denotes predicted value of uncertain parameters; $\overline{\xi}$ and $\underline{\xi}$ denote the upper and lower bound of prediction error, respectively, which can be set artificially; Γ denotes uncertainty parameter, and a value range thereof is 0 to 1.

Choosing mean absolute percentage error (MAPE) to describe the evaluation index of the prediction model, can be expressed as:

$$MAPE = \frac{100\%}{n} \sum_{i=1}^{n} \left| \frac{\xi - \hat{\xi}}{\xi} \right|,$$

where, n is the solution domain time step.

According to expressions of the cardinality-type uncertainty set and the MAPE, & can be expressed in two forms shown as follows:

$$\begin{cases} \xi = \Gamma * (\overline{\xi} - \underline{\xi}) + \hat{\xi} \\ \xi = -\Gamma * (\hat{\xi} - \underline{\xi}) + \hat{\xi} \end{cases}, \text{ and}$$

$$\begin{cases} \xi = MAPE * \xi + \hat{\xi} \\ \xi = -MAPE * \xi + \hat{\xi} \end{cases},$$

As long as let $(\overline{\xi} - \underline{\xi}) = \xi$, then a value expression form of the two kinds of ξ is basically consistent, and for the MAPE expression, in the case of known prediction model MAPE, the value range of ξ can be basically determined.

Obviously, MAPE-guided robust optimization is feasible and can avoid the defects of too conservative or insufficient reliability caused by random setting the value of Γ. It should be noted that the value range of $\Gamma$ is 0 to 1, while according to the existing advanced prediction model, a value range of the MAPE is [0, MAPE$^{max}$], generally MAPE$^{max}$ is 5% (due to the differences in the outputs of wind power and PV power, as well as the prediction accuracy of electricity, gas, and heat loads, here will take electricity load as an example to illustrate), and the MAPE is the mean prediction error, and in order to ensure the reliability of the solution results, considering some extreme cases, expand the value range of the MAPE to [0, 2*MAPE$^{max}$].

Because the value ranges of the two are different, in the present example, let $(\overline{\xi}-\underline{\xi})=2*\xi*$MAPE$^{max}$, then the conservativeness of the robust optimization can be directly controlled by $$\min F = \sum_{t=1}^{N}\left(C_{buy,i}^{t} + C_{om,i}^{t} + C_{DR,i}^{t}\right).$$

Wherein, if the prediction error of the training model is larger, the robust optimization algorithm $$\min F = \sum_{t=1}^{N}\left(C_{buy,i}^{t} + C_{om,i}^{t} + C_{DR,i}^{t}\right)$$

is larger, and the worst-case scenario of the output of source-load is more severe. At this time, the obtained control policy has stronger robustness and solves the defect of inaccurate prediction.

Figure 3:
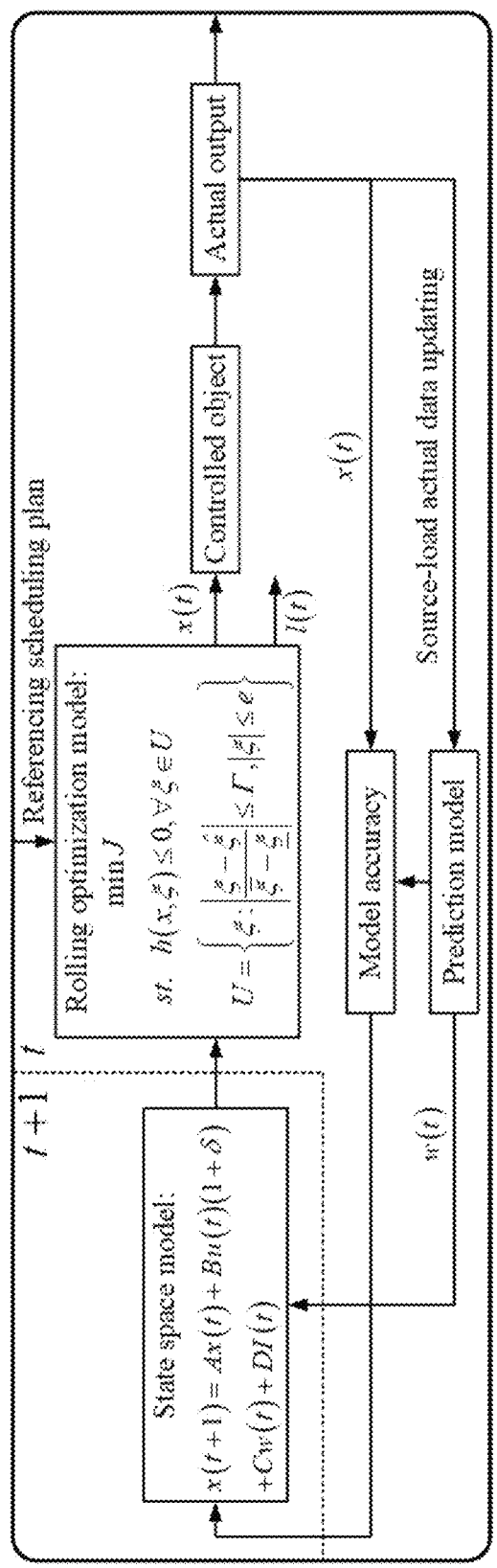
FIG. 3 is a framework diagram of source-load compound control of the double-loop feedback RMPC according to an example of the present invention.

The present invention proposed a source-load compound control framework based on the dual-loop feedback RMPC as shown in FIG. 3. By analyzing the multi-time scale characteristics of heterogeneous energy flows in IES, a multi-time scale control framework for equipment-side-load-side coordination is established, and the scheduling periods of different equipment and DR are given.

After day-ahead scheduling, the global initial reference scheduling plan is obtained, and the planned values are adjusted layer by layer in the intra-day stage to make the values closer to the actual situation, and the output plans of heat generation, gas and electricity equipment are issued in turn. Specifically, in the day-ahead scheduling stage, the PBDR of electric-gas load and Initial reference plans for electric power, gas and heat power related equipment are obtained through day-ahead source-load prediction data; In the stage of intra-day 1-hour scheduling, the electricity-heat ADR, the Class A IBDR of electric load and gas load, and outputs of equipment, such as CHP, GB, EB, HS, are obtained according to the latest source-load prediction data of intra-day 1-hour, and reference plans of electricity and gas for 15-minute scheduling period are provided.

In the stage of intra-day 15-minute scheduling, the ADR of the electricity and gas, the Class B IBDR of electric and gas loads, outputs of equipment, such as P2G and GS, and purchase quantity of gas are obtained based on the latest source-load prediction data of the intra-day 15-minute, and an electricity reference plan for the 5-minute scheduling period is provided. In the stage of intra-day 5-minute scheduling, the Class C IBDR of the electric load, outputs of the equipment, such as ES, WT and PV, and purchase quantity of electricity are obtained.

The objective function consists of two parts: day-ahead and intra-day, wherein the day-ahead mainly considers the economy of system operation. Therefore, an objective function of the day-ahead is expressed as:

$$\min F = \sum_{t=1}^{N}\left(C_{buy,i}^{t} + C_{om,i}^{t} + C_{DR,i}^{t}\right),$$

where, F is the total operation cost of IES; N is the scheduling period, and a time interval thereof is 1 hour in the present example; $C_{buy,i}^{t}$ is purchase cost of the i-class energy, $C_{om,i}^{t}$ is operation and maintenance cost of the i-class equipment, and $C_{DR,i}^{t}$ is cost of the i-class DR.

Purchase cost of electricity and purchase cost of gas of the IES are proportional to their purchased electrical power and purchased gas power, respectively. Therefore, those purchase costs can be expressed as:

$$C_{buy,e}^{t} = \sum_{t=1}^{T}(P_{e}^{t} * p_{e}^{t})\Delta t, \text{ and}$$

$$C_{buy,g}^{t} = \sum_{t=1}^{T}(G_{g}^{t} * p_{g}^{t})\Delta t,$$

where, $P_{e}^{t}$ is the purchased electrical power of IES from the distribution network, $G_{g}^{t}$ is the purchased gas power of IES, $p_{e}^{t}$ is an electricity price of purchasing the electricity from the distribution network at time t, and $p_{g}^{t}$ is a natural gas price at time t.

A cost of DR of IES can be summarized as:

$$C_{DR,i}^{t} = \sum_{t=1}^{T}(P_{\Delta,i}^{t} * p_{\Delta,i}^{t}),$$

where, $P_{\Delta,i}^{t}$ is a change quantity of the i-class load, and $p_{\Delta,i}^{t}$ is a compensation cost of the system for the change of the i-class load.

An objective function of the intra-day rolling part has three parts, which are: an objective function of controller of the electric power subsystem, with a control interval of 1 hour; an objective function of controller of the natural gas subsystem, with a control interval of 15 minutes; and an objective function of controller of the thermal power subsystem, with a control interval of 5 minutes.

The objective functions of the electric power, natural gas and thermal power subsystems can be uniformly described as:

$$\min F_{i} = \sum_{t=1}^{N}\left[\mu_{i} * (P_{i}^{t} - P_{i}^{t-1}) + \delta_{i}^{t} * (P_{i}^{t} - P_{i,ref}^{t})^{2} + C_{DR,i}^{t}\right],$$

where, $F_{i}$ is the scheduling cost of the i-class subsystem, $P_{i}^{t}$ is the output of the i-class equipment at intra-day time t, $P_{i}^{t-1}$ is the output of the i-class equipment at intra-day time t−1, $\mu_{i}$ is the output adjustment cost of the i-class equipment, $P_{i,ref}^{t}$ is the reference scheduling plan of the i-class equipment at time t, and $\delta_{i}^{t}$ is the output change penalty of the i-class equipment.

Constraints comprise:
(1) Equipment output constraints, comprising energy conversion equipment group, renewable energy equipment, hybrid energy storage system, upper and lower limits of power, specifically:

<Energy Conversion Equipment Group>

The energy conversion equipment in the system comprises CHP, P2G, EB, and GB. A balance equation of the input and output power is as follows:

$$\begin{bmatrix} P_{CHP,e}^t \\ P_{CHP,h}^t \\ P_{P2G,g}^t \\ P_{EB,h}^t \\ P_{GB,h}^t \end{bmatrix} = \begin{bmatrix} \eta_{CHP,e} & 0 & 0 & 0 \\ \eta_{CHP,h} & 0 & 0 & 0 \\ 0 & \eta_{P2G} & 0 & 0 \\ 0 & 0 & \eta_{EB} & 0 \\ 0 & 0 & 0 & \eta_{GB} \end{bmatrix} \begin{bmatrix} P_{g,CHP}^t \\ P_{e,P2G}^t \\ P_{e,EB}^t \\ P_{g,GB}^t \end{bmatrix},$$

where, $P_{CHP,e}^t$ and $P_{CHP,h}^t$ are the electric power and heat power output by CHP, respectively; $\eta_{CHP,e}$ and $\eta_{CHP,h}$ are the electricity generation efficiency and gas generation efficiency of the CHP, respectively; Pt cup is the input gas power to the CHP; $P_{P2G,g}^t$ and $P_{e,P2G,g}^t$ are the output gas power and input electric power of P2G, respectively; $\eta_{P2G}$ is the efficiency of converting electricity to gas; $P_{EB,h}^t$ and $P_{e,EB}^t$ are the output heat power and input electric power of EB, respectively; $\eta_{EB}$ is the heat generation efficiency of EB; $P_{GB,h}^t$ and $P_{g,GB}^t$ are the output heat power and input gas power of GB, respectively; $\eta_{GB}$ is the heat generation efficiency of GB.

<Renewable Energy Equipment>

The WT and PV installed in the IES may feed renewable energy into the energy grid. The output powers of the WT and the PV are respectively as follows:

$$P_{WT}^t = \begin{cases} 0 & v \leq v_{in}, v \geq v_{out} \\ \dfrac{v - v_{in}}{v_e - v_{in}} P_{WT}^e & v_{in} \leq v \leq v_e \\ P_{WT}^e & v_e \leq v \leq v_{out} \end{cases},$$

where, $P_{WT}^t$ is the generated power of the WT at time t; $v_{in}$ and $v_{out}$ are the cut-in wind speed and cut-out wind speed of the WT, respectively; $v_e$ is the rated wind speed; and, $P_{WT}^e$ is the rated power of the WT;

$$P_{PV}^t = P_{PV}^r \frac{G^t}{G_{ref}}[1 - 0.0045(T_0 + 0.03 \cdot G^t - T_{ref})],$$

where, $P_{PV}^t$ is the electric power output by the PV at time t; $P_{PV}^r$ is the rated power of the PV; $G^t$ and $G_{ref}$ are the light intensity at time t and the reference light intensity under standard test conditions, respectively; $T_0$ and $T_{ref}$ are the ambient temperature and the reference temperature under standard test conditions, respectively;

$$P_{AC,c}^t = \eta_{AC} P_{h,AC}^t,$$

where, $P_{AC,c}^t$ and $P_{h,AC}^t$ are the refrigeration power and heat power consumed by the absorption-type refrigerator at time t, respectively; and, $\eta_{ac}$ is the refrigeration coefficient of the absorption-type refrigerator.

<Hybrid Energy Storage System>

$$\begin{cases} S_i^{t+1} = S_i^t(1-\delta_i) + P_{i,chr}^t \eta_{i,chr} \Delta t \\ S_i^{t+1} = S_i^t(1-\delta_i) - P_{i,dis}^t / \eta_{i,dis} \Delta t \end{cases},$$

where, i represents the load type, in the present example, the i represents the three loads of electricity, heat and gas; St is the energy storage quantity at time t; $\delta_i$ is the self-loss coefficient; $P_{i,chr}^t$ and $P_{i,dis}^t$ are the power of charging and discharging energy at time t, respectively; $\eta_{i,chr}$ and $\eta_{i,dis}$ are the efficiency of charging and discharging energy, respectively.

<Upper and Lower Limits of Power>

$$P_i^{min} \leq P_i^t \leq P_i^{max},$$

where, i represents the energy conversion device, electricity purchase, gas purchase and energy discharge state; $P_i^t$ is the output power of the i-class equipment at time t; $P_i^{max}$ and $P_i^{min}$ are the maximum and minimum values of the output power of the i-class equipment at time t, respectively.

(2) Integrated Demand Response Model

The IES studied in the present example covers three kinds of load demand: electricity, gas and heat, which can be managed by demand response management. Wherein, the DRs of the electric and gas loads are divided into PBDR and IBDR according to different response modes. In addition, taking into account the characteristics of multi-energy complementary transformation, the electric-gas ADR and the electric-heat ADR have been introduced. The three together constitute the IDR model.

<PBDR>

The PBDR refers to energy companies guiding users to actively adjust energy consumption behavior according to their own circumstances by adjusting energy prices. In practice, the relationship between load demand variation and price variation is approximately exponential. In the present example, the PBDR model is constructed by using an exponential relationship model:

$$L_{PDR,i}^t = \begin{cases} L_{i,0}^t + \sum_{j=1}^{24} L_{i,t}^{+}\left(1 - e^{\varphi_{j,q}^i \cdot \Delta H_j^i}\right)\Delta H_j^i \leq 0 \\ L_{i,0}^t + \sum_{j=1}^{24} L_{i,t}^{-}\left(1 - e^{\varphi_{j,q}^i \cdot \Delta H_j^i}\right)\Delta H_j^i \geq 0 \end{cases},$$

where, i represents load types, in this formula, i represents electric and gas loads; $L_{PDR,i}^t$ is i-class load after PBDR; $L_{i,0}^t$ is initial energy consumption of the i-class load; $L_{i,t}^{+}$ and $L_{i,t}^{-}$ are saturation upper limit load and basic load of the i-class load, respectively; $\varphi_{j,q}^i$ is exponential elastic coefficient of the i-class load in period j to period q; $\Delta H_j^i$ is electricity price change quantity of the i-class load in period j.

Because different types of loads have different corresponding characteristics of energy price in different periods, the corresponding elastic coefficients are also different. The differential elastic coefficient matrix can be expressed as:

$$\varphi^i = \begin{bmatrix} \varphi_{1,1}^i & \varphi_{1,2}^i & \cdots & \varphi_{1,24}^i \\ \varphi_{2,1}^i & \varphi_{2,2}^i & \cdots & \varphi_{2,24}^i \\ \vdots & \vdots & \ddots & \vdots \\ \varphi_{24,1}^i & \varphi_{24,2}^i & \cdots & \varphi_{24,24}^i \end{bmatrix},$$

where, diagonal elements of the matrix are the self-elastic coefficients of the current period, and non-diagonal elements are the cross-elastic coefficients of the two periods, as shown in the following equations:

$$\begin{cases} \varphi_{aa} = \dfrac{\Delta P_a}{P_a^0} \dfrac{H_a}{\Delta H_a} \\ \varphi_{ab} = \dfrac{\Delta P_a}{P_a^0} \dfrac{H_b}{\Delta H_b} \end{cases},$$

where, $\Delta P$ and $\Delta H$ are the relative increments of electricity quantity and electricity price, respectively.

<ADR>

The ADR means that users can use other energy sources instead of the required energy through various types of coupling equipment. The energy conversion satisfies the energy conservation theorem. The ADR model is as follows:

$$L_{ADR,i}^t = \bar{L}_i^t + \Delta L_{ADR}^t,$$

$$\begin{bmatrix} L_{ADR,e}^t \\ L_{ADR,g}^t \\ L_{ADR,h}^t \end{bmatrix} = \begin{bmatrix} \bar{L}_e^t \\ \bar{L}_g^t \\ \bar{L}_h^t \end{bmatrix} + \begin{bmatrix} 0 & \phi_{g,e} & \phi_{h,e} \\ \phi_{e,g} & 0 & \phi_{h,g} \\ \phi_{e,h} & \phi_{g,h} & 0 \end{bmatrix} \begin{bmatrix} \bar{L}_e^t \\ \bar{L}_g^t \\ \bar{L}_h^t \end{bmatrix},$$

where, $L_{ADR,i}^t$ represents i-class load after ADR, wherein i represents electric, gas and heat loads, respectively; $\Delta L_{ADR}^t$ represents the quantity of replaced load; $\phi_{i,j}$ represents the conversion efficiency between energy source i and energy source j, wherein the present invention does not consider the conversion between heat and gas, then $\phi_{g,h}=\phi_{h,g}=0$; $\bar{L}_i^t$ represents the initial load. The calculation formula of $\phi_{i,j}$ is as follows:

$$\phi_{i,j} = \dfrac{W_i \eta_i}{W_j \eta_j},$$

where, $W_i$ and $W_j$ are unit heat values of the energy source i and the energy source j, respectively; $\eta_i$ and $\eta_j$ are utilization rates of the energy source i and the energy source j, respectively.

<IBDR>

The IBDR refers to energy providers that stimulate users to respond to system scheduling by incentivizing subsidies to adjust energy loads. The IBDR model is as follows:

$$\begin{cases} L_{IDR,i}^t = \bar{L}_i^t + \Delta L_{IDR,i}^t \\ F_{IDR,i}^t = \Delta L_{IDR,i}^t \cdot H_{IDR,i}^t \end{cases},$$

where, $L_{IDR,i}^t$ represents i-class load after IBDR, wherein i represents electric and gas loads, respectively; $\Delta L_{IDR,i}^t$ is response quantity of the i-class load; $F_{IDR,i}^t$ is response cost of the i-class load; and $H_{IDR,i}^t$ is compensation price.

<Upper and Lower Limits of DR>

$$P_{i,dr}^{min} \leq P_{i,dr}^t \leq P_{i,dr}^{max},$$

where, i represents electric, gas and heat loads; $P_{i,dr}^t$ is IDR quantity (sum of the above three response quantities) of the i-class load at time t; $P_{i,dr}^{max}$ and $P_{i,dr}^{min}$ are the maximum and minimum values of the IDR quantity of the i-class load at time t, respectively.

<Energy Balance Constraint>

$$\begin{cases} L_e^t + P_{e,chr}^t + P_{e,EB}^t + P_{e,P2G}^t = P_{e,buy}^t + P_{CHP,e}^t + P_{e,dis}^t + P_{PV}^t + P_{WT}^t + P_{e,dr}^t \\ L_h^t + P_{h,chr}^t = P_{CHP,h}^t + P_{h,dis}^t + P_{EB,h}^t + P_{GB,h}^t + P_{h,dr}^t \\ L_g^t + P_{g,chr}^t + P_{g,GB}^t + P_{g,CHP}^t = P_{g,dis}^t + P_{P2G,g}^t + P_{e,buy}^t + P_{g,dr}^t \end{cases},$$

where, $L_e^t$, $L_h^t$, and $L_g^t$ are the electric, heat and gas loads of IES at time t, respectively; $P_{e,dr}^t$, $P_{h,dr}^t$ and $P_{g,dr}^t$ are the IDR quantities of electric, heat and gas loads at time t, respectively; $P_{e,chr}^t$ and $P_{e,dis}^t$ are the charging and discharging powers of the ES at time t, respectively; $P_{h,chr}^t$ and $P_{h,dis}^t$ are the charging and discharging power of the HS at time t, respectively; $P_{g,chr}^t$ and $P_{g,dis}^t$ are the charging and discharging power of the GS at time t.

Wherein, the day-ahead optimization comprises equipment constraints, energy balance constraints and electricity and gas PBDR constraints for all load types, while the intra-day 1-hour, 15-minute and 5-minute rolling control optimizations comprise partial equipment constraints and energy balance constraints for heat, electric and gas load types respectively, as well as IDR quantity constraints that must be determined on the corresponding time scale. The day-ahead and intra-day objective functions and constraints are put into the source-load compound control framework based on dual-loop feedback RMPC, and the intra-day rolling part is solved by RMPC algorithm.

So far, a source-load compound control model of IES based on dual-loop feedback RMPC is established, and the output of each equipment and IDR in the corresponding scheduling period is solved by using dual-loop feedback RMPC algorithm based on CPLEX solver, so as to realize the optimal control of the IES. In order to verify the performance of the proposed method in dealing with uncertain problems, the following four solutions are set up for comparison.

Solution 1: adopting deterministic scheduling policy without considering the source-load randomness.

Solution 2: adopting Robust optimal scheduling policy; the uncertainty is set to 0.8, 0.5 and 0.2, respectively.

Solution 3: adopting random optimization policy;

Solution 4: adopting light robust optimization policy.

The comparison results are shown in Table 1. It can be seen from the table that the cost of the deterministic optimization is the lowest. However, due to the large prediction error of renewable energy and multi-energy load, a loss of load probability of the IES is high, and the obtained policy cannot be practically applied. The total operation cost of each algorithm increases when source-load uncertainty is considered. Wherein, the operation cost of the stochastic optimization method is the closest to the operation cost of the deterministic operation, but its high loss of load probability cannot guarantee the stable operation of the system. The total operation cost of the Robust optimization method increases gradually with the increase of uncertain parameter Γ, and the loss of load probability decreases gradually. This is because the source-load uncertainty interval increases with the increase of Γ, the worst scenario severity increases, in order to resist greater uncertainty, the total operation cost increases, and the corresponding loss of load probability decreases because the requested plan can meet the worst scenario. In contrast, the method proposed in the present invention has the lowest loss of load probability and better economy.

TABLE 1

Test Results for Uncertain Optimization Algorithms

| Uncertain algorithm | Total operation cost (RMB, yuan) | Loss of Load Probability (%) |
|---|---|---|
| Deterministic Optimization | 6744.8 | 10.7 |
| Stochastic Optimization | 6985.5 | 6.4 |
| Robust Optimization (Γ = 0.8) | 7501.7 | 3.2 |
| Robust Optimization (Γ = 0.5) | 7240.8 | 4.9 |
| Robust Optimization (Γ = 0.2) | 6990.1 | 7.2 |
| Light Robust Optimization | 7234.4 | 3.9 |
| Method of Present Invention | 7127.7 | 2.8 |

Figure 5:
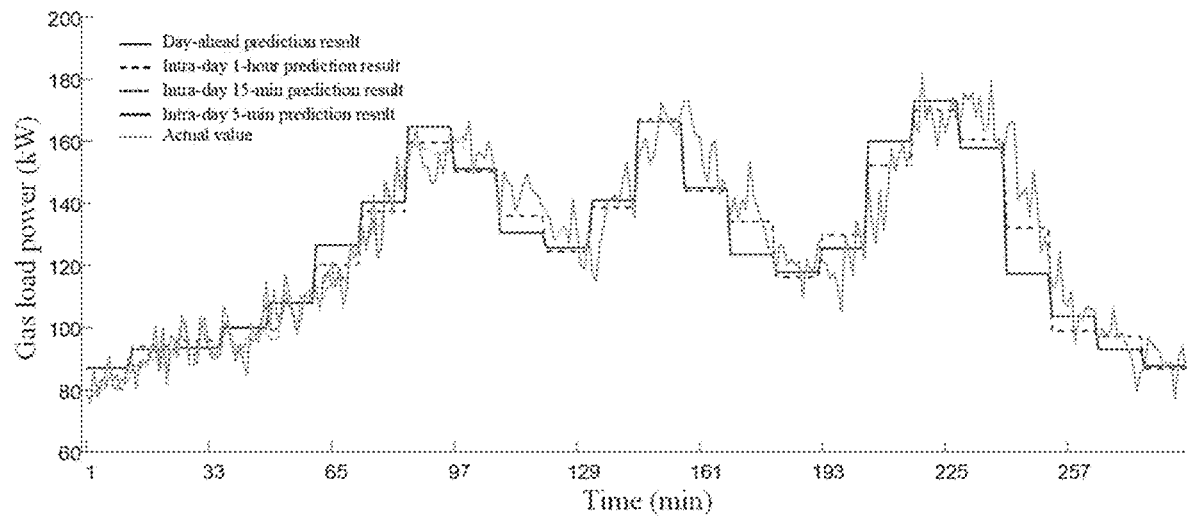
FIG. 5 is a multi-time scale prediction result of a natural gas load according to an example of the present invention.
Figure 6:
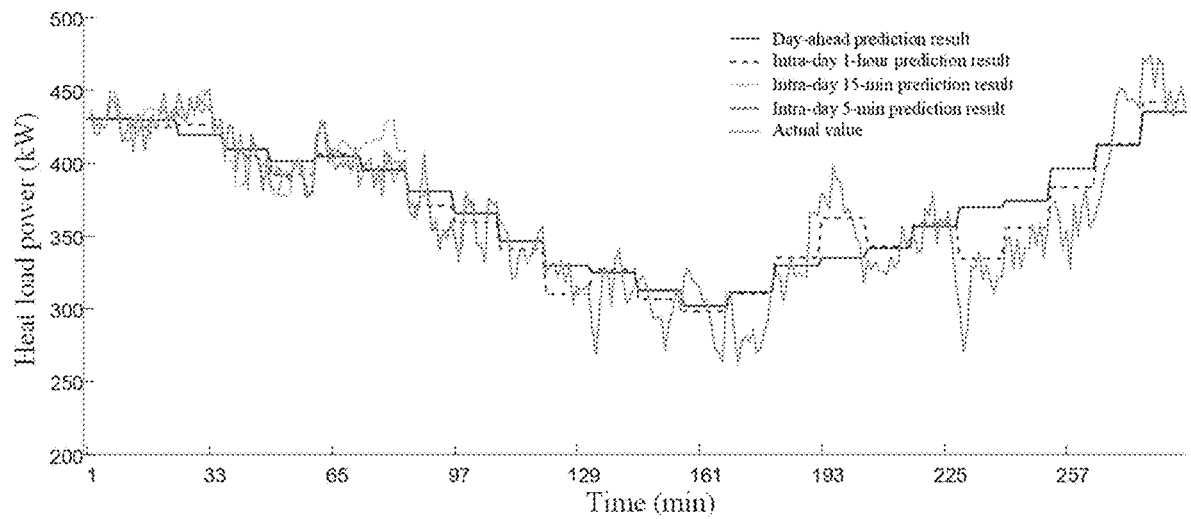
FIG. 6 is a multi-time scale prediction result of a heat load according to an example of the present invention.

In order to further verify the effectiveness of the proposed method, simulation is carried out using the IES as shown in FIG. 1, and the optimization results are shown in FIGS. 4 and 5.

It can be seen from FIGS. 4 and 5 that the prediction accuracy of the electric load, gas load or heat load decreases significantly with the decrease of time scale, and the prediction accuracy of intra-day 1-hour-interval greatly deviates from the actual value. Therefore, the error of optimal scheduling policy based on day-ahead prediction results is often large. In actual operation, scheduling deviation is stabilized only by purchasing energies from the external energy network, which produces a lot of extra costs and brings great pressure to external power grid. Performing intra-day rescheduling based on the day-ahead scheduling and using more accurate prediction results can effectively avoid the above problems.

Figure 7:
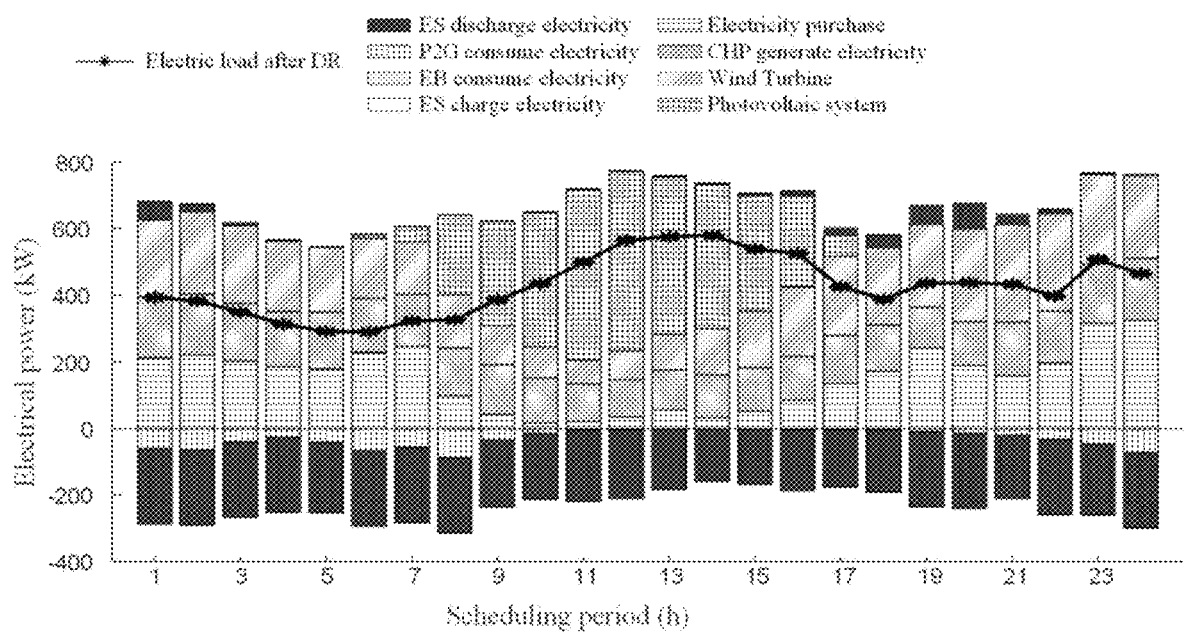
FIG. 7 is a day-ahead scheduling result of electric power according to an example of the present invention.
Figure 8:
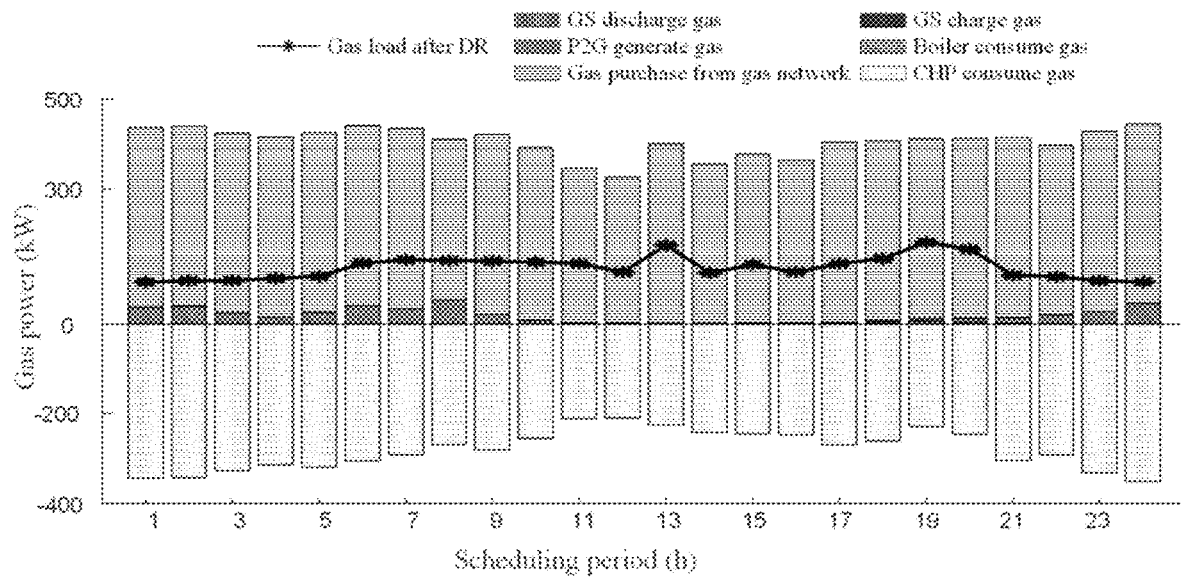
FIG. 8 is a day-ahead scheduling result of natural gas power according to an example of the present invention.
Figure 9:
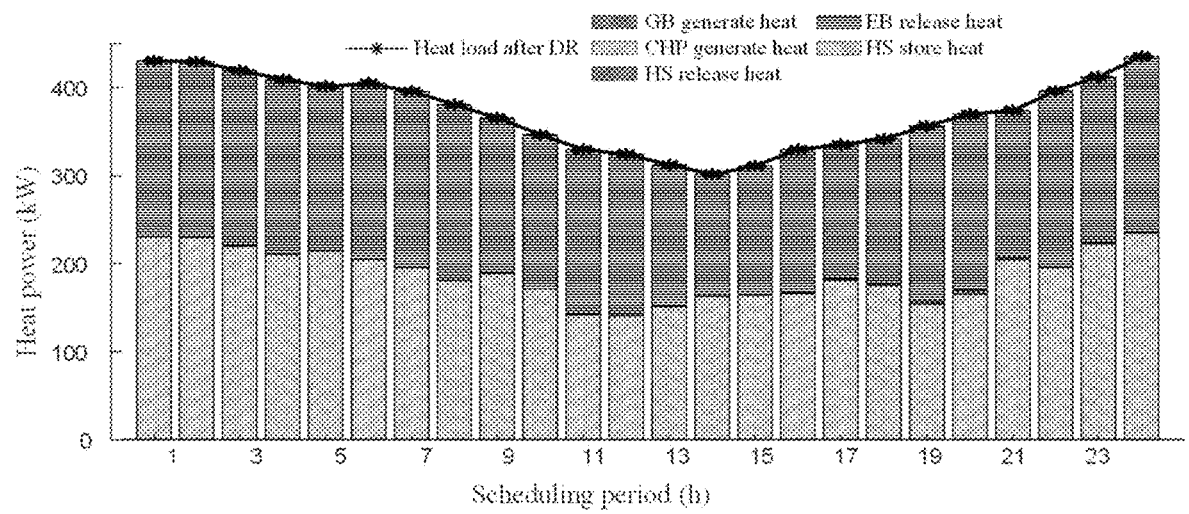
FIG. 9 is a day-ahead scheduling result of heat power according to an example of the present invention.

FIGS. 7 to 9 show the day-ahead scheduling results. As can be seen from FIGS. 7 and 8, the CHP maintains a high output level almost all the time, because in the present example, the gas price is low and the external wind and solar energy resources are abundant, and the CHP operation cost is low. It can be seen from FIG. 7 that even if the wind and solar output is sufficient to meet the load demand, electricity is still purchased from the power grid because the electricity price is relatively low, and the purchased electric energy can effectively reduce the cost of other electric-drive equipment. It can be seen from FIGS. 8 and 9 that both the P2G equipment and the EB equipment maintain a high output level.

Figure 10:
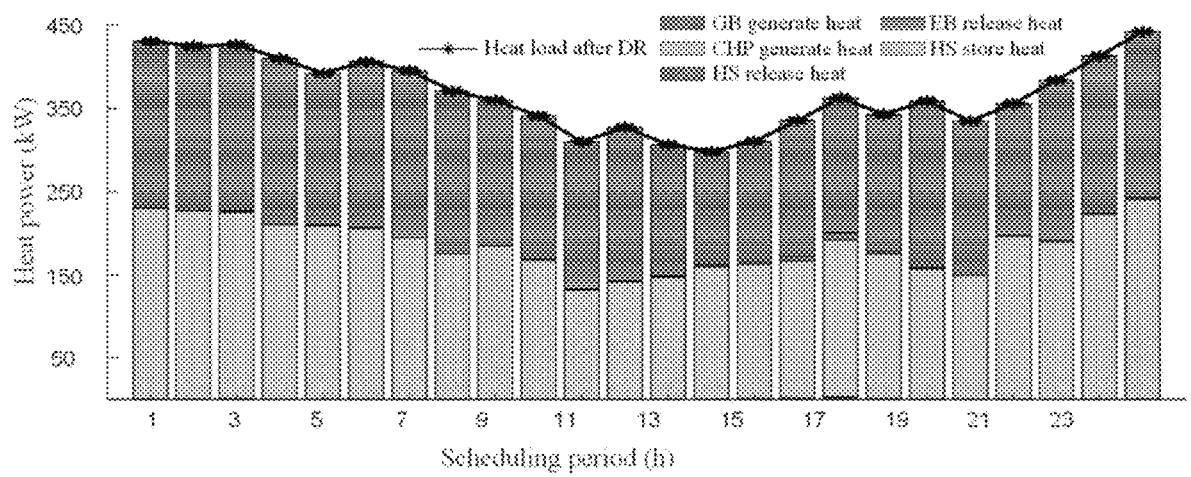
FIG. 10 is an intra-day 1-hour scheduling result of the heat power according to an example of the present invention.
Figure 11:
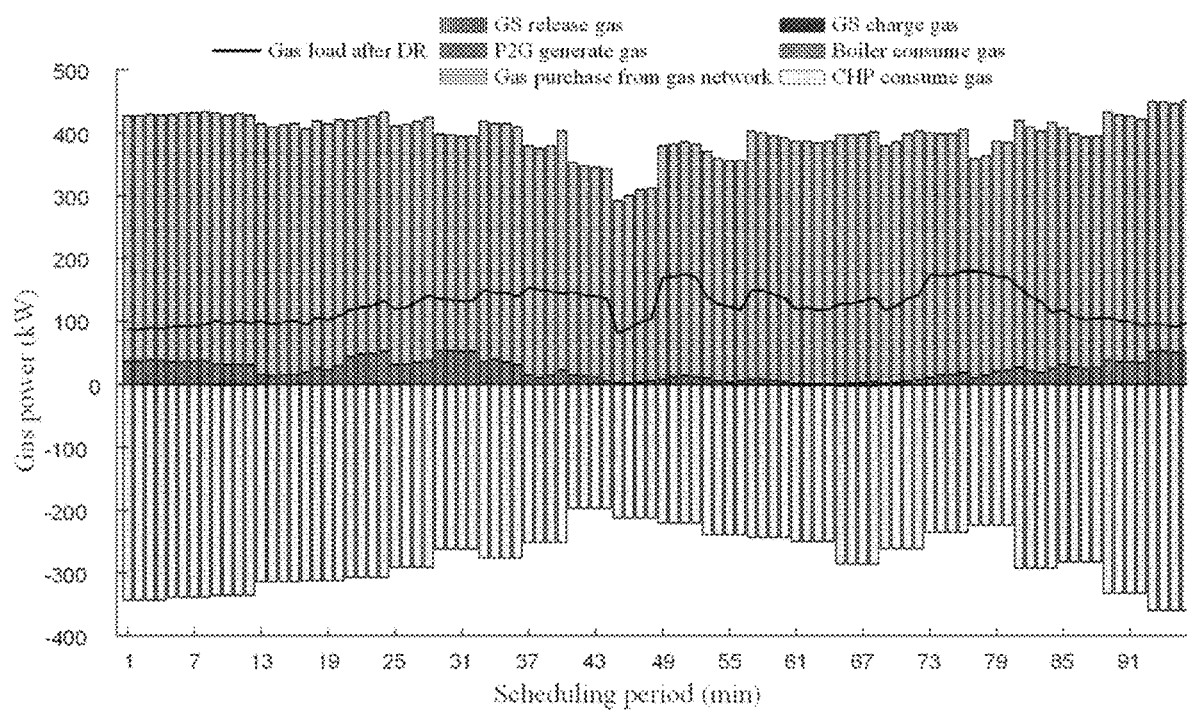
FIG. 11 is an intra-day 15-minute scheduling result of the natural gas power according to an example of the present invention.
Figure 12:
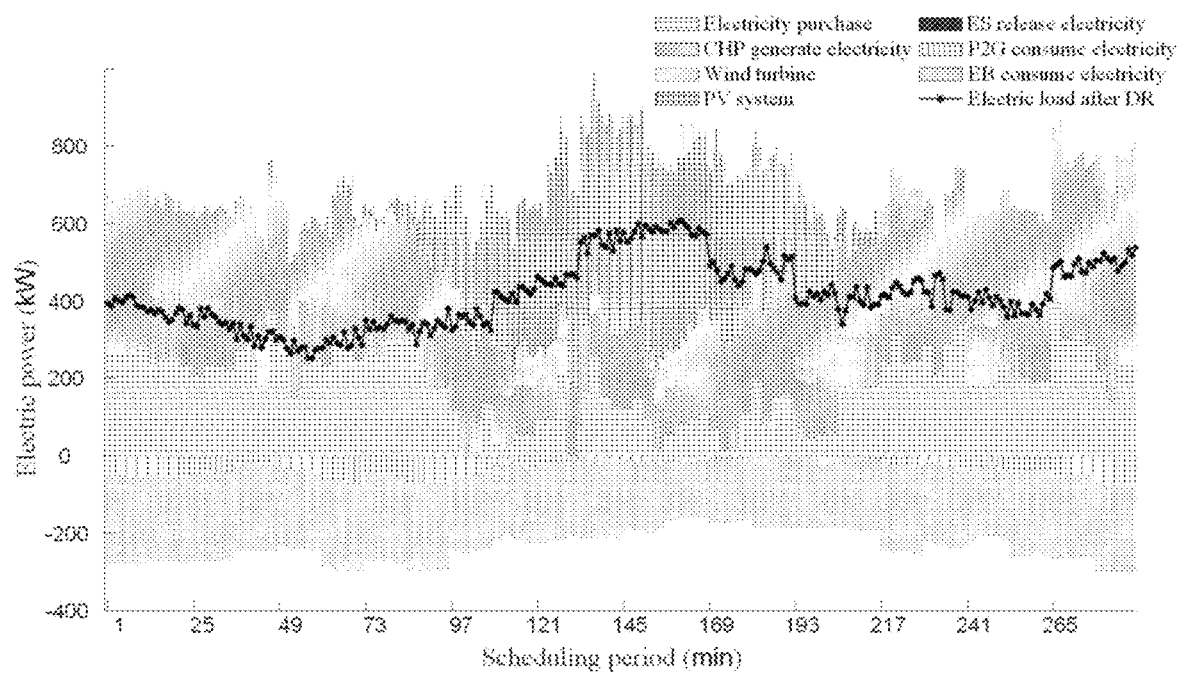
FIG. 12 is an intra-day 5-minute scheduling result of the electric power according to an example of the present invention.
Figure 13:
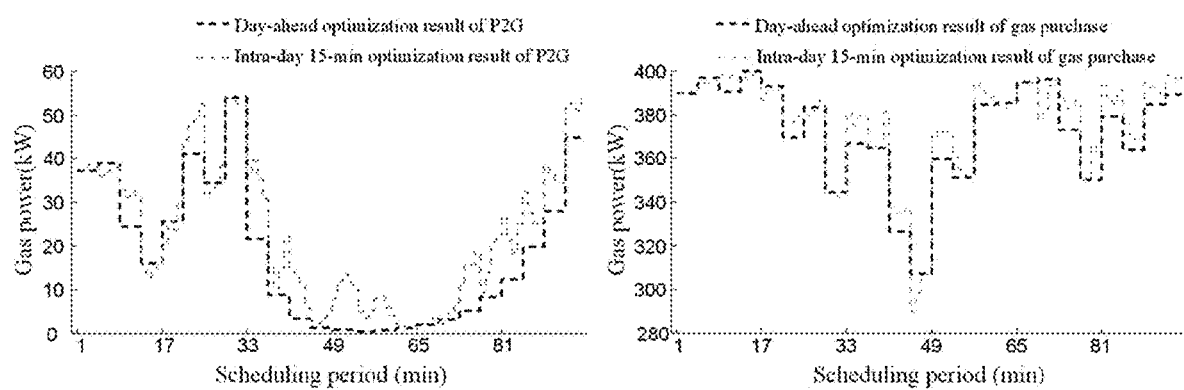
FIG. 13 is an intra-day 15-minute adjustment result of natural gas subsystem-related equipment according to an example of the present invention.
Figure 14:
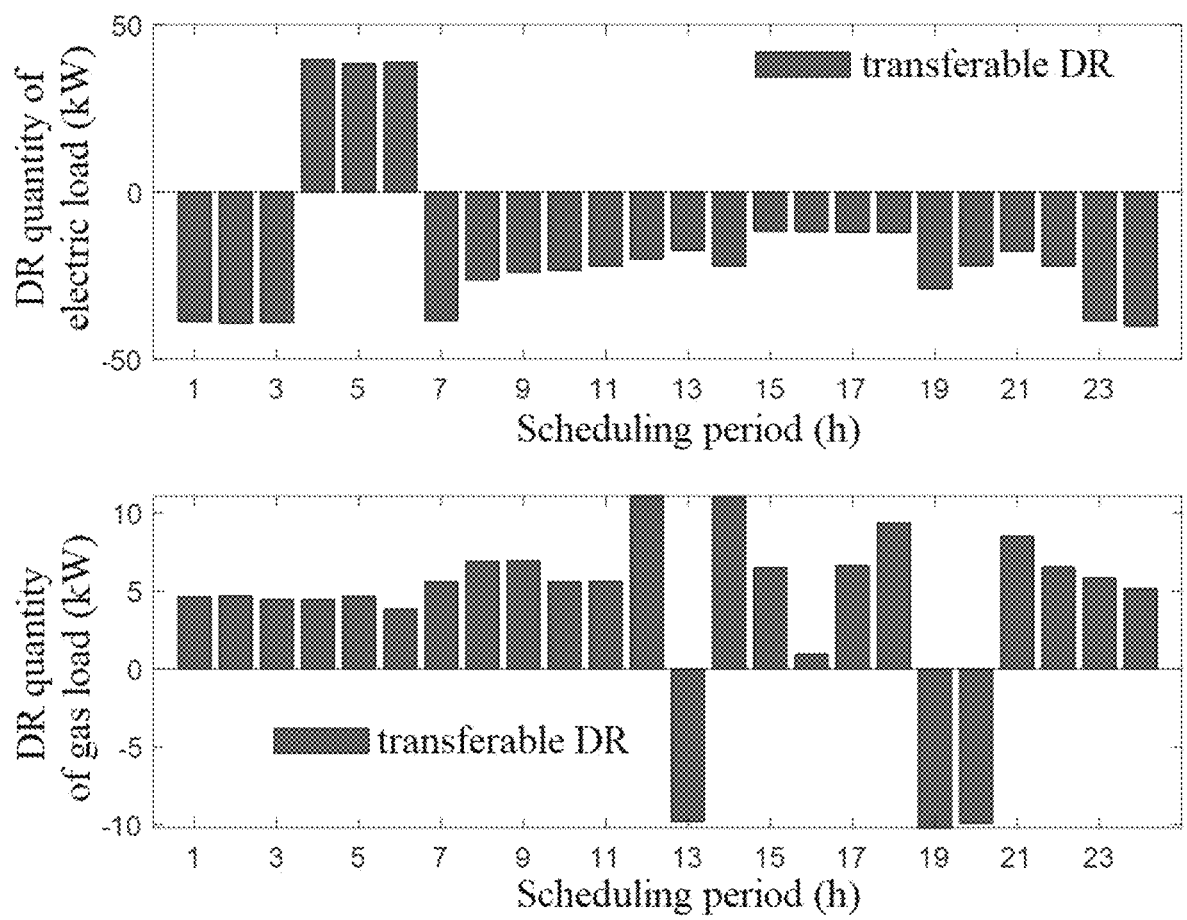
FIG. 14 is a day-ahead comprehensive DR result according to an example of the present invention.
Figure 15:
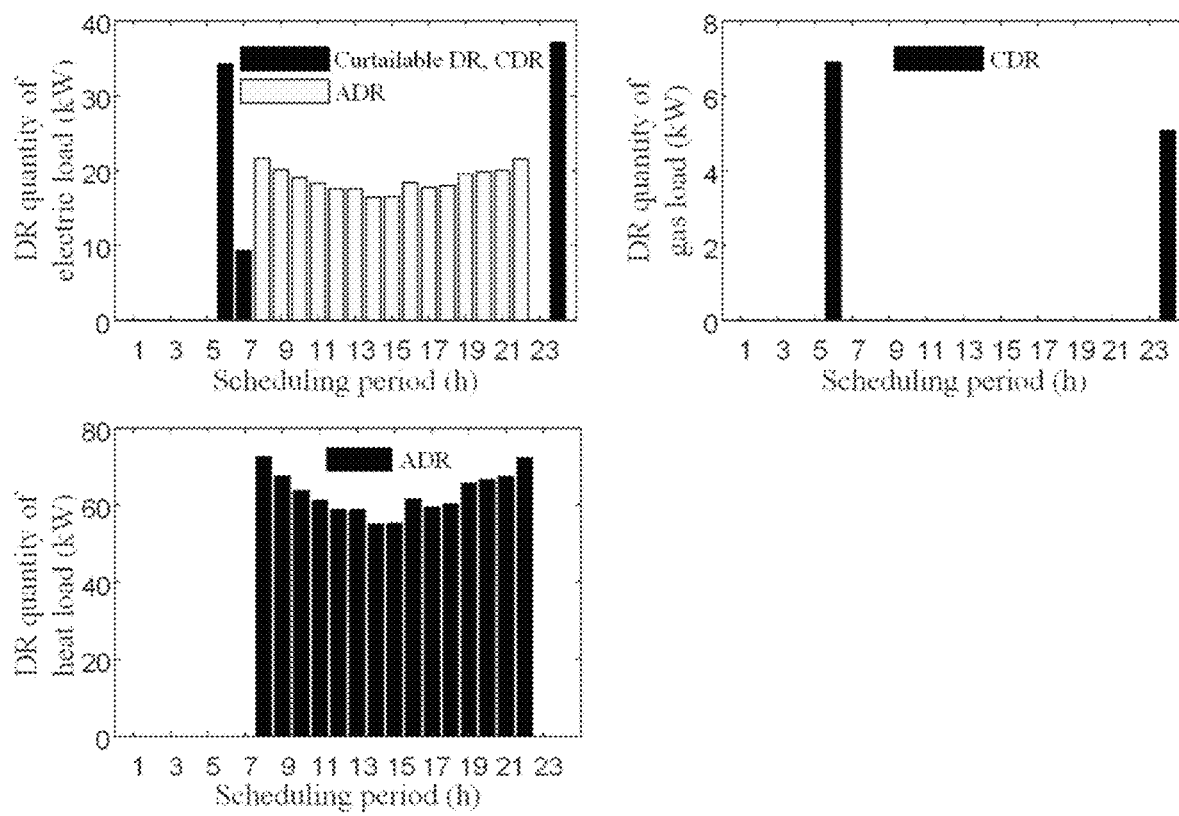
FIG. 15 is an intra-day 1-hour comprehensive DR result according to an example of the present invention.
Figure 16:
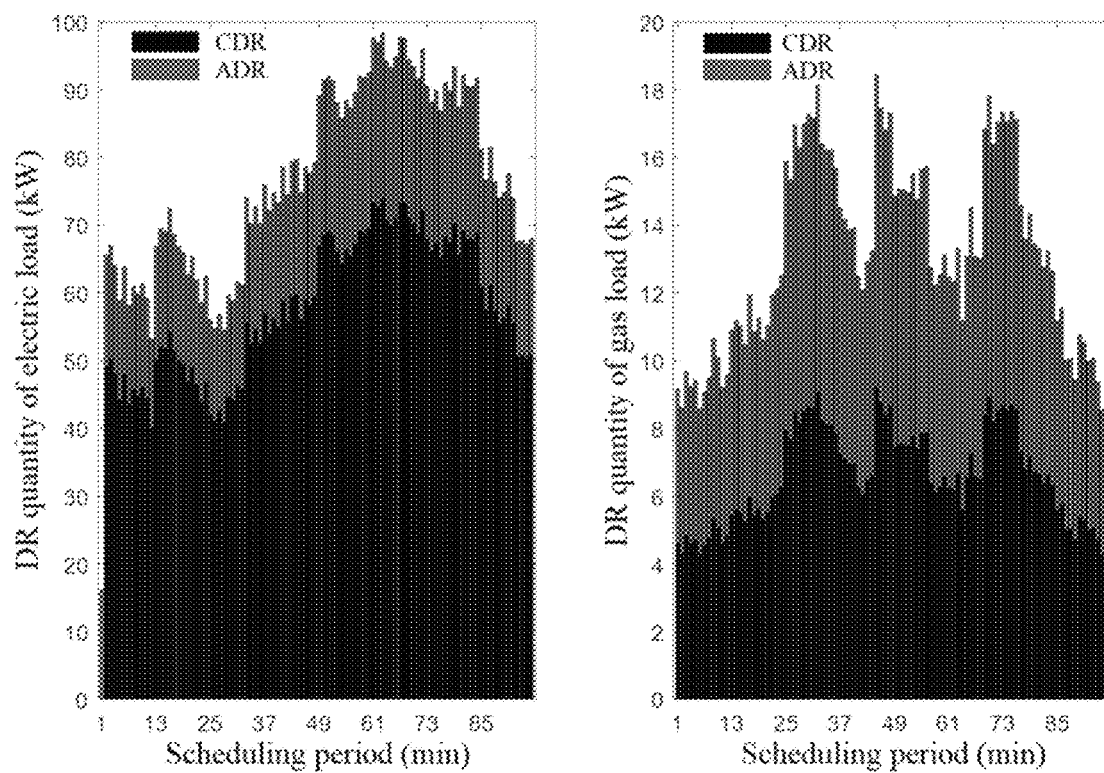
FIG. 16 is an intra-day 15-minute comprehensive DR result according to an example of the present invention.
Figure 17:
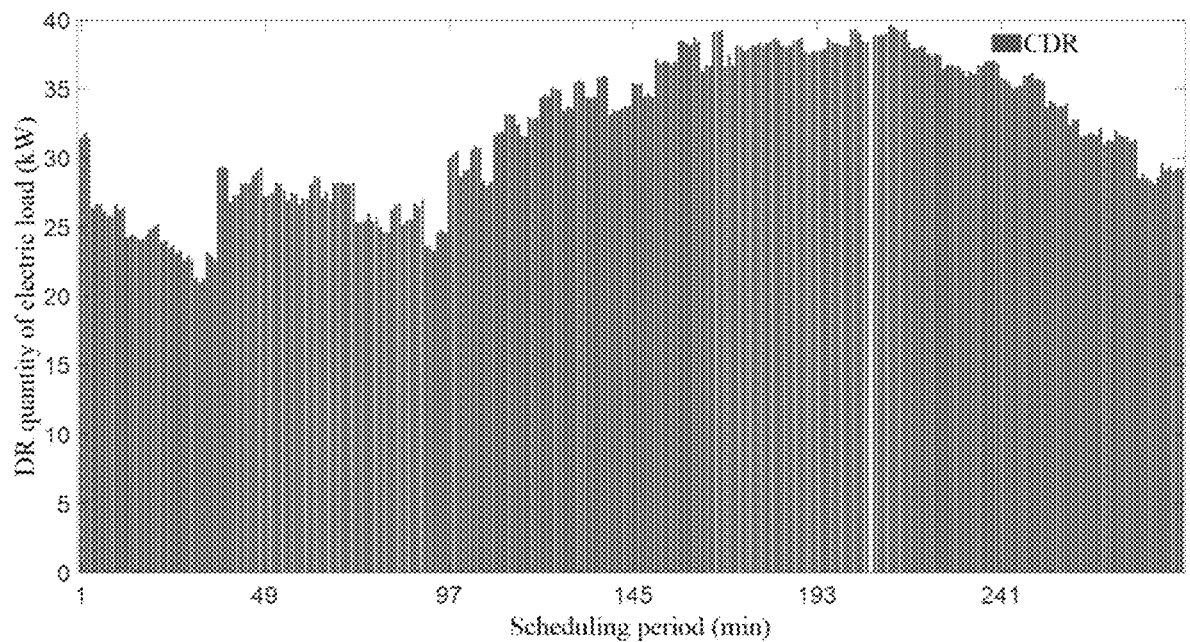
FIG. 17 is an intra-day 5-minute comprehensive DR result according to an example of the present invention.

FIGS. 10 to 12 show the results of intra-day rescheduling. The load curves in the figure are the results of the superposition of intra-day rolling prediction result and the DR quantity of the previous stage. In the intra-day stage, the proposed method re-schedules heat equipment, gas equipment and electrical equipment through three sub-controllers with different time scales, which greatly improves the flexibility of energy supply side of the IES, and is of great significance to avoid uncertain effects. Moreover, the differential scheduling cycle for equipment not only effectively avoids the slow dynamic equipment (heat, gas) from being in a dynamic process at all times due to too frequent instructions, affecting the quality of energy supply, but also fully stimulates the flexibility of power equipment and greatly exerts its ability to stabilize uncertainty. FIG. 13 takes the intra-day 15-minute scheduling of gas equipment as an example. It can be found that the equipment output changes under the condition that the intra-day source-load prediction results change. This refined management of equipment is conducive to promoting renewable energy consumption.

FIGS. 14 to 17 show DR quantities at different time scales. The proposed method fully considers the differences in different DR periods and dynamic characteristics, and executes different types of DRs at different time scales, greatly improving the flexibility of the demand-side. Combined with FIGS. 11 to 13, the proposed method can fully activate the flexibility of supply-side equipment and demand-side DR, which is of great significance for resisting uncertainty.

Example 2

The present example provides a system of multi-time scale compound control of IES based on dual-loop feedback RMPC, comprising:
a day-ahead source-load prediction data acquisition module, configured to: acquire day-ahead source-load prediction data of an IES; wherein, the IES comprises an electric power subsystem, a thermal power subsystem and a natural gas subsystem;
an initial scheduling plan obtaining module, configured to: process the acquired day-ahead source-load prediction data of the IES through a day-ahead scheduling, to obtain a PBDR of the electric load and an initial reference scheduling plan of relevant equipment in the electric power subsystem, the natural gas subsystem and the thermal power subsystem; and
a compound control module, configured to:
process the acquired day-ahead source-load prediction data of the IES through two stages of day-ahead scheduling and intra-day calibrating, obtaining an IBDR of electric load and physical values of adjustments of outputs of relevant equipment in the electric power subsystem, the thermal power subsystem and the natural gas subsystem; wherein,
in the day-ahead scheduling stage, determining a PBDR of the electric load and the initial reference scheduling plan of relevant equipment in the electric power subsystem, the natural gas subsystem and the thermal power subsystem; and
in the intra-day calibrating stage, based on the PBDR of the electric load and the initial reference scheduling plan of the relevant equipment in the electric power subsystem, the natural gas subsystem and the thermal power subsystem, dividing the intra-day calibrating into a fast-control sub-layer, a median-control sub-layer and a slow-control sub-layer according to a dynamic characteristic difference of multi-heterogeneous energy source; performing a differential control by using controllers with different time scales; constructing a dual-loop feedback structure at each of the sub-layers by taking control time intervals of the each of the sub-layers as corresponding scales; acquiring output disturbances of equipment and the DR by an inner loop, and feeding back to an outer loop; updating a source-load data in the outer loop, dynamically training a system state prediction model, adjusting uncertain parameters in the IES through guiding a robust optimization algorithm, adjusting a reference scheduling plan output from an upper sub-layer layer by layer;
wherein, according to a solution result from the slow-control sub-layer, determining an IDR quantity of heat load, adjusting outputs of a CHP, a GB, an EB and a HS in the thermal power subsystem, and correcting a reference trajectory of the median-control sub-layer; according to a solution result from the median-control sub-layer, determining an IDR quantity of gas load, adjusting outputs of a P2G and a GS in the natural gas subsystem, adjusting a purchase quantity of gas simultaneously, and correcting a reference trajectory of the fast-control sub-layer; and, according to a solution result from the fast-control sub-layer, determining an IDR quantity of electric load, adjusting an output of an ES, and adjusting a purchase quantity of electricity simultaneously.

Example 3

The present example provides a computer-readable storage medium, wherein the computer-readable storage medium is non-transitory, having a computer program stored thereon; wherein, when the computer program is executed by a processor, implements steps of the method of multi-time scale compound control of an IES based on dual-loop feedback RMPC described above.

Example 4

The present example provides a computer device, wherein the computer device comprises a memory, a processor, and a computer program stored in the memory and executable on the processor; wherein, when the processor executing the program, implementing steps of the method of multi-time scale compound control of an IES based on dual-loop feedback RMPC described above.

Those skilled in the art should understand that the examples of the present invention can be provided as methods, systems, or computer program products. Therefore, the present invention may take the form of hardware examples, software examples, or examples combining software and hardware aspects. Furthermore, the present invention may take the form of a computer program product implemented on one or more computer usable storage media (including but not limited to disk memory, optical memory, etc.) containing computer usable program codes.

The present invention is described with reference to flowcharts and/or block diagrams of methods, devices (systems), and computer program products according to the examples of the present invention. It should be understood that each of the processes and/or boxes in the flowchart and/or block diagram, and the combination of the processes and/or boxes in the flowchart and/or block diagram, may be implemented by computer program instructions. These computer program instructions may be provided to a processor of a general purpose computer, a specialized computer, an embedded processor, or other programmable data processing device to produce a machine such that the instructions executed by the processor of the computer or other programmable data processing device produce a device for implementing the functions specified in one process or multiple processes of the flowchart and/or one box or multiple boxes of the block diagram.

These computer program instructions may also be stored in a computer-readable memory capable of directing the computer or other programmable data processing apparatus to operate in a particular manner such that the instructions stored in such the computer-readable memory produce an article of manufacture comprising an instruction device that implements the function specified in one process or a plurality of processes of the flowchart and/or one box or a plurality of boxes of the block diagram.

These computer program instructions may also be loaded onto a computer or other programmable data processing device to enable a series of operational steps to be performed on the computer or other programmable device to generate a computer implemented process, so that instructions executed on a computer or other programmable device provide steps for implementing functions specified in one process or a plurality of processes of the flowchart and/or in one box or a plurality of boxes of the block diagram.

Those skilled in the art can understand that the realization of all or part of the processes in the methods of the above examples can be accomplished by instructing relevant hardware through a computer program. The program can be stored in a computer-readable storage medium. When the program is executed, it may comprise the processes of the examples of the above methods. The storage medium may be a disk, optical disc, Read-only memory (ROM) or random access memory (RAM).

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. A method of multi-time scale compound control of an integrated energy system (IES) based on dual-loop feedback robust model predictive control (RMPC), comprising:

acquiring day-ahead source-load prediction data of an IES;

based on the acquired day-ahead source-load prediction data of the IES, obtaining an incentive-based demand response (IBDR) of electric load and outputs of electrical related equipment through two stages of a day-ahead scheduling and an intra-day rescheduling;

wherein, in the day-ahead scheduling stage, determining a price-based demand response (PBDR) of the electric load and the gas load, and initial reference scheduling plans of electrical, thermal and gas-related equipment; and in the intra-day rescheduling stage, based on the PBDRs of the electric and gas loads and the initial reference scheduling plans of the electrical, thermal and gas-related equipment, dividing the intra-day rescheduling into a first-control sub-layer, a second-control sub-layer and a third-control sub-layer according to a dynamic characteristic difference of multi-heterogeneous energy source; performing a differential control by using controllers with different time scales;

constructing a double-layer feedback structure at each of the sub-layers by taking control time intervals of the each of the sub-layers as corresponding scales; acquiring output disturbances of equipment and a demand response (DR) by an inner loop, and feeding back to an outer loop; updating a source-load data in the outer loop, dynamically training a system state prediction model, adjusting uncertain parameters in the IES through guiding a robust optimization algorithm, adjusting a reference scheduling plan output from an upper sub-layer layer by layer, and outputting the IBDR of the electric load and the outputs of the electrical related equipment; wherein, according to dynamic characteristic differences of multi-heterogeneous energy sources, the intra-day rescheduling is divided into the first-, second- and third-control sub-layers, and performing a differential control by using controllers with different time scales, which comprises:

in the intra-day rescheduling stage, in the first-control sub-layer, taking an electrical power subsystem as a control target, setting a control time interval as a first scale, obtaining first-class reference scheduling plans of electrical and gas according to a latest source-load prediction data in the first scale, and inputting the first-class reference scheduling plans into the second-control sub-layer; in the second-control sub-layer, taking a natural gas subsystem as a control target, setting a control time interval as a second scale, obtaining a second-class reference scheduling plan of the electrical power according to a latest source-load prediction data in the second scale, inputting the second-class reference scheduling plan into the third-control sub-layer; and, in the third-control sub-layer, taking an electrical power subsystem as a control target, setting a control time interval as a third time scale, and obtaining the IBDR of the electric load and the outputs of the electrical related equipment according to a latest source-load prediction data in the third scale;

wherein, the uncertain parameters comprise outputs of a wind power and a photovoltaic (PV), and the electric, heat and gas loads.

2. The method of multi-time scale compound control of the IES based on dual-loop feedback RMPC according to claim 1, wherein the first scale>the second scale>the third scale, and the first scale, the second scale and the third scale are coupled.

3. The method of multi-time scale compound control of the IES based on dual-loop feedback RMPC according to claim 1, wherein in the outer loop, updating the source-load data, dynamically training the system state prediction model, and adjusting the uncertain parameters in the IES through guiding the robust optimization algorithm, comprising:

characterizing, by cardinality uncertainty sets, output disturbances of the equipment and the DR, and taking the output disturbances of the equipment and the DR as intra-day rolling scheduling constraints of a current scale by including the output disturbances in a state space equation, to predict states of the IES; and evaluating in real-time a prediction accuracy of the system state prediction model, adjusting conservative parameters of the robust optimization algorithm at a next time according to the prediction accuracy of the system state prediction model at a current time, and obtaining the uncertain parameters based on the adjusted conservative parameters.

4. The method of multi-time scale compound control of the IES based on dual-loop feedback RMPC according to claim 3, wherein the state space equation comprises:

$$x(t+1|t)=A_x x(t)+B_u u(t) \odot d(t)+B_w w(t)$$

$$y_c(t)=C_c x(t),$$

where, x(t) is a state variable matrix of equipment output, u(t) is a control variable matrix, d(t) is a disturbance variable matrix of output of a controlled object, w(t) is a disturbance variable matrix, and $y_c(t)$ is an output variable matrix; wherein, $$A_x = \begin{bmatrix} 1 & 0 & 0 & 0 & 0 \\ 0 & 1 & 0 & 0 & 0 \\ \alpha & \beta & 1-\sigma & 0 & 0 \\ 0 & 0 & 0 & 1 & 0 \\ 0 & 0 & 0 & 0 & 1 \end{bmatrix},$$

-continued $$B_u = \begin{bmatrix} 1 & 0 & 0 \\ 0 & 1 & 0 \\ \alpha & \beta & 0 \\ 0 & 1 & 0 \\ 0 & 0 & 1 \end{bmatrix},$$

$$B_w = \begin{bmatrix} 0 & 0 & 0 & 0 & 0 & 0 \\ 0 & 0 & 0 & 0 & 0 & 0 \\ 0 & 0 & 0 & 0 & 0 & 0 \\ 1 & -1 & -1 & -1 & 1 & 1 \\ 0 & 0 & 0 & 0 & 0 & 0 \end{bmatrix},$$

$$C_c = \begin{bmatrix} 0 & 0 & 1 & 0 & 0 \\ 0 & 0 & 0 & 1 & 0 \end{bmatrix},$$

where, $$\alpha = \frac{\eta_{ES.chr}}{E_{bat}}\Delta t, \beta = \frac{-1}{E_{bat}\eta_{ES.dis}}\Delta t;$$

wherein, $\eta_{ES.chr}$ is a charging efficiency of an electricity storage (ES) equipment, $E_{bat}$ is a state of charge (SOC), $\Delta t$ is a time interval, and $\eta_{ES.dis}$ is a discharge efficiency of the ES.

5. The method of multi-time scale compound control of the IES based on dual-loop feedback RMPC according to claim 1, wherein a model of the day-ahead scheduling is:

$$\min F = \sum_{t=1}^{N}(C_{buy,i}^t + C_{om,i}^t + c_{DR,i}^t),$$

$$C_{buy,e}^t = \sum_{t=1}^{T}(P_e^t * p_e^t)\Delta t,$$

$$C_{buy,g}^t = \sum_{t=1}^{T}(G_g^t * p_g^t)\Delta t,$$

$$C_{DR,i}^t = \sum_{t=1}^{T}(P_{\Delta,i}^t * p_{\Delta,i}^t),$$

where, F is a total operation cost of the IES; N is a scheduling period; $C_{buy,i}^t$ is purchase cost of an i-class energy, $C_{om,i}^t$ is operation and maintenance cost of i-class equipment, and $C_{DR,i}^t$ is cost of an i-class DR; $P_e^t$ is a purchased electrical power of IES from the distribution network, $G_g^t$ is a purchased gas power of IES, $p_e^t$ is an electricity price of purchasing the electricity from the distribution network at time t, and $p_g^t$ is a natural gas price at time t; $P_{\Delta,i}^t$ is a change quantity of an i-class load, and $p_{\Delta,i}^t$ is a compensation cost of the system for the change of the i-class load.

6. The method of multi-time scale compound control of the IES based on dual-loop feedback RMPC according to claim 1, wherein a scheduling model of the intra-day rescheduling stage comprises:

an objective function of the electric power subsystem, the natural gas subsystem and the electric power subsystem is:

$$\min F_i = \sum_{t=1}^{N}[\mu_i * (P_i^t - P_i^{t-1}) + \delta_i^t * (P_i^t - P_{i,ref}^t)^2 + c_{DR,i}^t],$$

where, $F_i$ is a scheduling cost of an i-class subsystem, $P_i^t$ is an output of i-class equipment at intra-day time t, $P_i^{t-1}$ is an output of the i-class equipment at intra-day time t−1, $\mu_i^t$ is an output adjustment cost of the i-class equipment, $P_{i,ref}^t$ is a reference scheduling plan of the i-class equipment at time t, and $\delta_i^t$ is an output change penalty of the i-class equipment; and constraint conditions comprise equipment output constraint, integrated demand response (IDR) constraint and energy balance constraint;

wherein, the equipment output constraint comprises:

energy conversion equipment group:

$$\begin{bmatrix} P_{CHP,e}^t \\ P_{CHP,h}^t \\ P_{P2G,g}^t \\ P_{EB,h}^t \\ P_{GB,h}^t \end{bmatrix} = \begin{bmatrix} \eta_{CHP,e} & 0 & 0 & 0 \\ \eta_{CHP,h} & 0 & 0 & 0 \\ 0 & \eta_{P2G} & 0 & 0 \\ 0 & 0 & \eta_{EB} & 0 \\ 0 & 0 & 0 & \eta_{GB} \end{bmatrix} \begin{bmatrix} P_{g,CHP}^t \\ P_{e,P2G}^t \\ P_{e,EB}^t \\ P_{g,GB}^t \end{bmatrix}$$

where, $P_{CHP,e}^t$ and $P_{CHP,h}^t$ are electric power and heat power output by a combined heat and power unit (CHP), respectively; $\eta_{CHP,e}$ and $\eta_{CHP,h}$ are electricity generation efficiency and gas generation efficiency of the CHP, respectively; $P_{g,CHP}^t$ is input gas power to the CHP; $P_{P2G,g}^t$ and $P_{e,P2G}^t$ are output gas power and input electric power of an electric power-to-gas unit (P2G), respectively; $\eta_{P2G}$ is an efficiency of converting electricity to gas; $P_{EB,h}^t$ and $P_{e,EB}^t$ are output heat power and input electric power of an electric boiler (EB), respectively; $\eta_{EB}$ is a heat generation efficiency of the EB; $P_{GB,h}^t$ and $P_{g,GB}^t$ are output heat power and input gas power of a gas boiler (GB), respectively; $\eta_{GB}$ is a heat generation efficiency of the GB;

renewable energy equipment:

$$P_{Wind}^t = \begin{cases} 0 & v \leq v_{in}, v \geq v_{out} \\ \frac{v - v_{in}}{v_e - v_{in}}P_{Wind}^e & v_{in} \leq v \leq v_e \\ P_{Wind}^e & v_e \leq v \leq v_{out} \end{cases},$$

$$P_{PV}^t = P_{PV}^r \frac{G^t}{G_{ref}}[1 - 0.0045(T_0 + 0.03 \cdot G^t - T_{ref})],$$

$$P_{AC,c}^t = \eta_{AC}P_{h,AC}^t$$

where, $P_{Wind}^t$ is a generated power of a wind turbine (WT) at time t; $v_{in}$ and $v_{out}$ are cut-in wind speed and cut-out wind speed of the WT, respectively; $v_e$ is a rated wind speed; $P_{Wind}^e$ is a rated power of the WT; $P_{PV}^t$ is an electric power output by a photovoltaic (PV) system at the time t; $P_{PV}^r$ is a rated power of the PV system; $G^t$ and $G_{ref}$ are a light intensity at the time t and a reference light intensity under standard test conditions, respectively; $T_0$ and $T_{ref}$ are a ambient temperature and a reference temperature under standard test conditions, respectively; $P_{AC,c}^t$ and $P_{h,AC}^t$ are a refrigeration power and a heat power consumed by an absorption-type refrigerator at the time t, respectively; and, $\eta_{AC}$ is a refrigeration coefficient of the absorption-type refrigerator;

hybrid energy storage system:

$$\begin{cases} S_i^{t+1} = S_i^t(1-\delta_i) + P_{i,chr}^t \eta_{i,chr} \Delta t \\ S_i^{t+1} = S_i^t(1-\delta_i) - P_{i,dis}^t / \eta_{i,dis} \Delta t \end{cases}, \quad 5$$

where, $P_i^t$ is an output power of i-class equipment at time t; $P_i^{max}$ and $P_i^{min}$ are maximum and minimum values of the output power of the i-class equipment at the time t, respectively;

upper and lower limits of power:

$$P_i^{min} \le P_i^t \le P_i^{max},$$

where, $P_i^t$ is an output power of i-class equipment at time t; $P_i^{max}$ and $P_i^{min}$ are maximum and minimum values of the output power of the i-class equipment at the time t, respectively;

the IDR constraint comprises:

a PBDR constraint:

$$L_{PDR,i}^t = \begin{cases} L_{i,0}^t + \sum_{j=1}^{24} L_{i,t}^+ \left(1 - e^{\varphi_{j,q}^i \cdot \Delta H_j^i}\right), \Delta H_j^i \le 0 \\ L_{i,0}^t + \sum_{j=1}^{24} L_{i,t}^- \left(1 - e^{\varphi_{j,q}^i \cdot \Delta H_j^i}\right), \Delta H_j^i \ge 0 \end{cases},$$

where, $L_{PDR,i}^T$ is an i-class load after the PBDR; $L_{i,0}^t$ is an initial energy consumption of the i-class load; $L_{i,t}^+$ and $L_{i,t}^-$ are saturation upper limit load and basic load of the i-class load, respectively; $\varphi_{j,q}^i$ is an exponential elastic coefficient of the i-class load in a period j to a period q; $\Delta H_j^i$ is an electricity price change quantity of the i-class load in the period j;

an alternative demand response (ADR) constraint:

$$L_{ADR,i}^t = \overline{L_i^t} + \Delta L_{ADR}^t,$$

$$\begin{bmatrix} L_{ADR,e}^t \\ L_{ADR,g}^t \\ L_{ADR,h}^t \end{bmatrix} = + \begin{bmatrix} 0 & \phi_{g,e} & \phi_{h,e} \\ \phi_{e,g} & 0 & \phi_{h,g} \\ \phi_{e,h} & \phi_{g,h} & 0 \end{bmatrix} \begin{bmatrix} \overline{L_e^t} \\ \overline{L_g^t} \\ \overline{L_h^t} \end{bmatrix},$$

where, $L_{ADR,i}^t$ is an i-class load after the ADR; $\Delta L_{ADR}^t$ is a quantity of replaced load; $\phi_{i,j}$ is a conversion efficiency between an energy source i and an energy source j, wherein $\phi_{g,h} = \phi_{h,g} = 0$; $\overline{L_i^t}$ is an initial load; $W_i$ and $W_j$ are unit heat values of the energy source i and the energy source j, respectively; $\eta_i$ and $\eta_j$ are utilization rates of the energy source i and the energy source j, respectively;

an IBDR constraint:

$$\begin{cases} L_{IDR,i}^t = \overline{L_i^t} + \Delta L_{IDR,i}^t \\ F_{IDR,i}^t = \Delta L_{IDR,i}^t \cdot H_{IDR,i}^t \end{cases},$$

where, $L_{IDR,i}^t$ is an i-class load after the IBDR; $\Delta L_{IDR,i}^t$ is a response quantity of the i-class load; $F_{IDR,i}^t$ is a response cost of the i-class load; and $H_{IDR,i}^t$ is a compensation price;

upper and lower limits of DR:

$$P_{i,dr}^{min} \le P_{i,dr}^t \le P_{i,dr}^{max},$$

where, $P_{i,dr}^t$ is an IDR quantity of an i-class load at time t; $P_{i,dr}^{max}$ and $P_{i,dr}^{min}$ are maximum and minimum values of the IDR quantity of the i-class load at the time t, respectively;

and, the energy balance constraint comprises:

$$\begin{cases} L_e^t + P_{e,chr}^t + P_{e,EB}^t + P_{e,P2G}^t = P_{e,buy}^t + P_{CHP,e}^t + P_{e,dis}^t + P_{PV}^t + P_{WT}^t + P_{e,dr}^t \\ L_h^t + P_{h,chr}^t = P_{CHP,h}^t + P_{h,dis}^t + P_{EB,h}^t + P_{GB,h}^t + P_{h,dr}^t \\ L_g^t + P_{g,chr}^t + P_{g,GB}^t + P_{g,CHP}^t = P_{g,dis}^t + P_{P2G,g}^t + P_{e,buy}^t + P_{g,dr}^t \end{cases},$$

where, $L_e^t$, $L_h^t$, and $L_g^t$ are electric, heat and gas loads of the IES at time t, respectively; $P_{e,dr}^t$, $P_{h,dr}^t$ and $P_{g,dr}^t$ are IDR quantities of the electric, heat and gas loads at the time t, respectively; $P_{e,chr}^t$ and $P_{e,dis}^t$ are charging and discharging powers of electric energy storage at the time t, respectively; $P_{h,chr}^t$ and $P_{h,dis}^t$ are charging and discharging power of heat energy storage at the time t, respectively; and, $P_{g,chr}^t$ and $P_{g,dis}^t$ are charging and discharging power of gas energy storage at the time t, respectively.

7. A computer-readable storage medium, wherein the computer-readable storage medium is non-transitory, having a computer program stored thereon; wherein, when the computer program is executed by a processor, implements steps of a method of multi-time scale compound control of an IES based on dual-loop feedback RMPC according to claim 1.

8. A computer device, wherein the computer device comprises a memory, a processor, and a computer program stored in the memory and executable on the processor; wherein, when the processor executing the program, implementing steps of a method of multi-time scale compound control of an IES based on dual-loop feedback RMPC according to claim 1.

9. A system of multi-time scale compound control of IES based on dual-loop feedback RMPC, comprising:
   a day-ahead source-load prediction data acquisition module, configured to: acquire day-ahead source-load prediction data of an IES;
   a compound control module, configured to:
   based on the acquired day-ahead source-load prediction data of the IES, obtaining an incentive-based demand response (IBDR) of electric load and outputs of electrical related equipment through two stages of day-ahead scheduling and intra-day rescheduling;
   wherein, in the day-ahead scheduling stage, determining a price-based demand response (PBDR) of the electric load and the gas load, and initial reference scheduling plans of electrical, thermal and gas-related equipment; and
   in the intra-day rescheduling stage, based on the PBDRs of the electric and gas loads and the initial reference scheduling plans of the electrical, thermal and gas-related equipment, dividing the intra-day rescheduling into a first-control sub-layer, a second-control sub-layer and a third-control sub-layer according to a dynamic characteristic difference of multi-heterogeneous energy source; performing a differential control by using controllers with different time scales;
   constructing a double-layer feedback structure at each of the sub-layers by taking control time intervals of the each of the sub-layers as corresponding scales; acquiring output disturbances of equipment and a demand response (DR) by an inner loop, and feeding back to an outer loop; updating a source-load data in the outer loop, dynamically training a system state prediction model, adjusting uncertain parameters in the IES through guiding a robust optimization algorithm, adjusting a reference scheduling plan output from an upper sub-layer layer by layer, and outputting the IBDR of the electric load and the outputs of the electrical related equipment; wherein,
   according to dynamic characteristic differences of multi-heterogeneous energy sources, the intra-day rescheduling is divided into the first-, second- and third-control sub-layers, and performing differential control by using controllers with different time scales, which comprises:
   in the intra-day rescheduling stage, in the first-control sub-layer, taking an electrical power subsystem as a control target, setting a control time interval as a first scale, obtaining first-class reference scheduling plans of the electrical power and the gas according to a latest source-load prediction data in the first scale, and inputting the first-class reference scheduling plans into the second-control sub-layer; in the second-control sub-layer, taking a natural gas subsystem as a control target, setting a control time interval as a second scale, obtaining a second-class reference scheduling plan of the electrical power according to a latest source-load prediction data in the second scale, inputting the second-class reference scheduling plan into the third-control sub-layer; and, in the third-control sub-layer, taking an electrical power subsystem as a control target, setting a control time interval as a third time scale, and obtaining the IBDR of the electric load and the outputs of the electrical related equipment according to a latest source-load prediction data in the third scale;
   wherein, the uncertain parameters comprise outputs of a wind power and a photovoltaic (PV), and the electric, heat and gas loads.

* * * * *